(12) United States Patent
Fujishiro et al.

(10) Patent No.: US 10,231,276 B2
(45) Date of Patent: Mar. 12, 2019

(54) USER TERMINAL AND ACCESS POINT

(71) Applicant: KYOCERA CORPORATION, Kyoto (JP)

(72) Inventors: Masato Fujishiro, Yokohama (JP); Yushi Nagasaka, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/605,612

(22) Filed: May 25, 2017

(65) Prior Publication Data

US 2017/0265241 A1   Sep. 14, 2017

Related U.S. Application Data

(63) Continuation of application No. PCT/JP2015/083127, filed on Nov. 25, 2015.

(30) Foreign Application Priority Data

Nov. 27, 2014   (JP) ................. 2014-240646

(51) Int. Cl.
*H04W 48/08* (2009.01)
*H04W 76/15* (2018.01)
*H04W 16/14* (2009.01)
*H04W 72/04* (2009.01)
(Continued)

(52) U.S. Cl.
CPC .......... *H04W 76/15* (2018.02); *H04W 16/14* (2013.01); *H04W 48/08* (2013.01); *H04W 72/04* (2013.01);
(Continued)

(58) Field of Classification Search
CPC ... H04W 84/12; H04W 76/025; H04W 76/15; H04W 88/06; H04W 48/08
See application file for complete search history.

(56) References Cited

U.S. PATENT DOCUMENTS

| 2013/0083783 A1* | 4/2013 | Gupta ............... H04W 4/70 370/338 |
| 2015/0078360 A1 | 3/2015 | Wang et al. |
| 2017/0265241 A1 | 9/2017 | Fujishiro et al. |

FOREIGN PATENT DOCUMENTS

| WO | 2013143051 A1 | 10/2013 |
| WO | 2013/166963 A1 | 11/2013 |

(Continued)

OTHER PUBLICATIONS

International Search Report issued in PCT/JP2015/083127; dated Feb. 23, 2016.
(Continued)

*Primary Examiner* — Jamal Javaid
(74) *Attorney, Agent, or Firm* — Studebaker & Brackett PC

(57) ABSTRACT

In a communication system according to an embodiment, a base station transmits first information for establishing a second data bearer, to a user terminal in a state where a predetermined data bearer is established. The predetermined data bearer is a first data bearer passes through the base station without passing through an access point. The second data bearer: passes through the base station and the access point; and is for aggregation in which the cellular communication and the WLAN communication are used to communicate data of the user terminal. The first information includes a bearer identifier indicating the predetermined data bearer and type information associated with the bearer identifier. The user terminal starts control to change the predetermined data bearer from the first data bearer to the second data bearer if the type information indicates a change from the first data bearer to the second data bearer.

11 Claims, 11 Drawing Sheets

(51) Int. Cl.
H04W 84/04 (2009.01)
H04W 84/12 (2009.01)
H04W 88/06 (2009.01)

(52) U.S. Cl.
CPC .......... *H04W 84/042* (2013.01); *H04W 84/12* (2013.01); *H04W 88/06* (2013.01)

(56) References Cited

FOREIGN PATENT DOCUMENTS

| WO | 2014/043500 A1 | 3/2014 |
|---|---|---|
| WO | 2016/084865 A1 | 8/2017 |

OTHER PUBLICATIONS

Intel Corp.; "Idle Mode Procedures of WLAN/3GPP Radio Interworking for LTE"; 3GPP TSG-RAN WG2 Meeting #86; May 19-23, 2014; pp. 1-4; R2-142130; 3GPP Organizational Partners; Seoul, South Korea.

Intel Corp.; "Stage-2 Details of WLAN/3GPP Radio Interworking for LTE"; 3GPP TSG-RAN WG2 Meeting #86; May 19-23, 2014; pp. 1-8; R2-142949; 3GPP Organizational Partners; Seoul, South Korea.

Qualcomm Inc.; "Study Item Proposal on E-UTRAN and WLAN Aggregation"; 3GPP TSG RAN Meeting #64; Jun. 10-13, 2014; pp. 1-5; 3GPP RP-140738; 3GPP Organizational Partners; Sophia Antipolis, France.

Huawei, CMCC; Discussion on the direct inteface between 3GPP and WLAN; 3GPP TSG-RAN3 Meeting #85bis; R3-142176; Oct. 6-10, 2014; Shanghai, China.

Catt, "Discussion on Architectural and Procedure of C-plane for LTE-WLAN Aggregation", 3GPP TSG RAN WG2 Meeting #90, R2-152125, Fukuoka, Japan, May 25, 2015, pp. 2-6.

\* cited by examiner

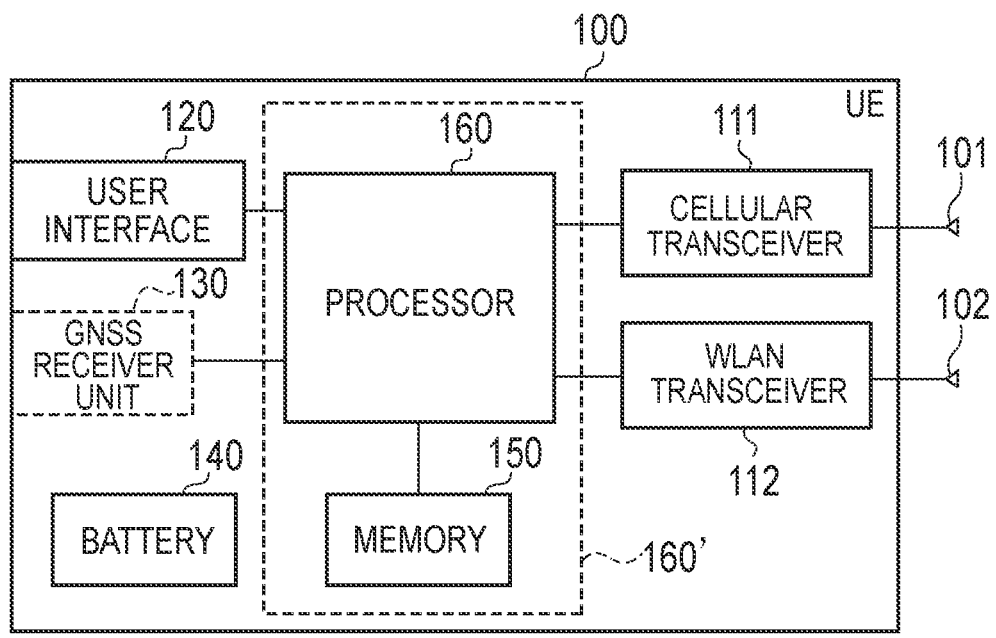
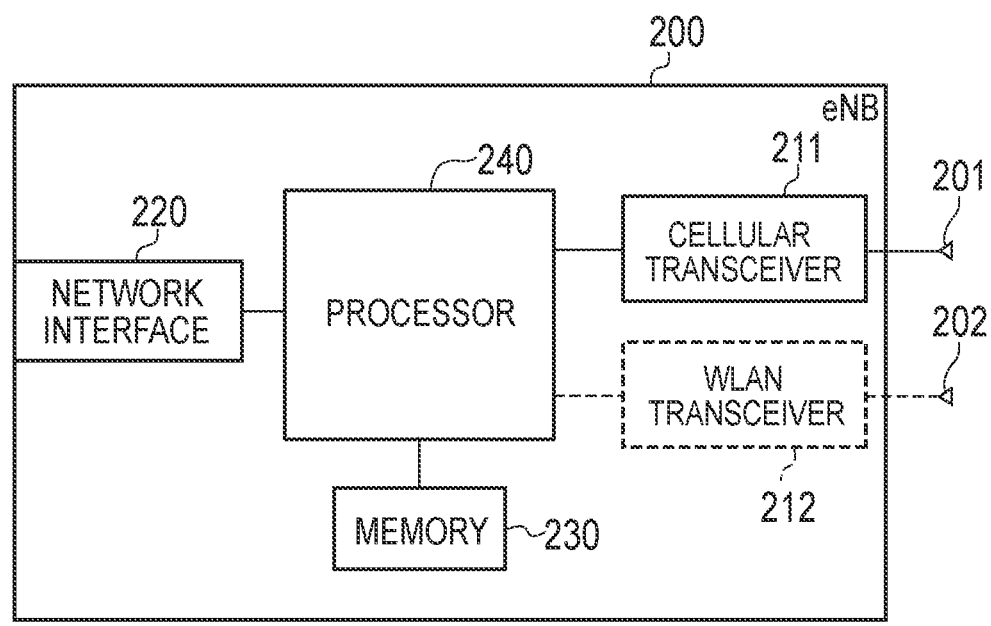

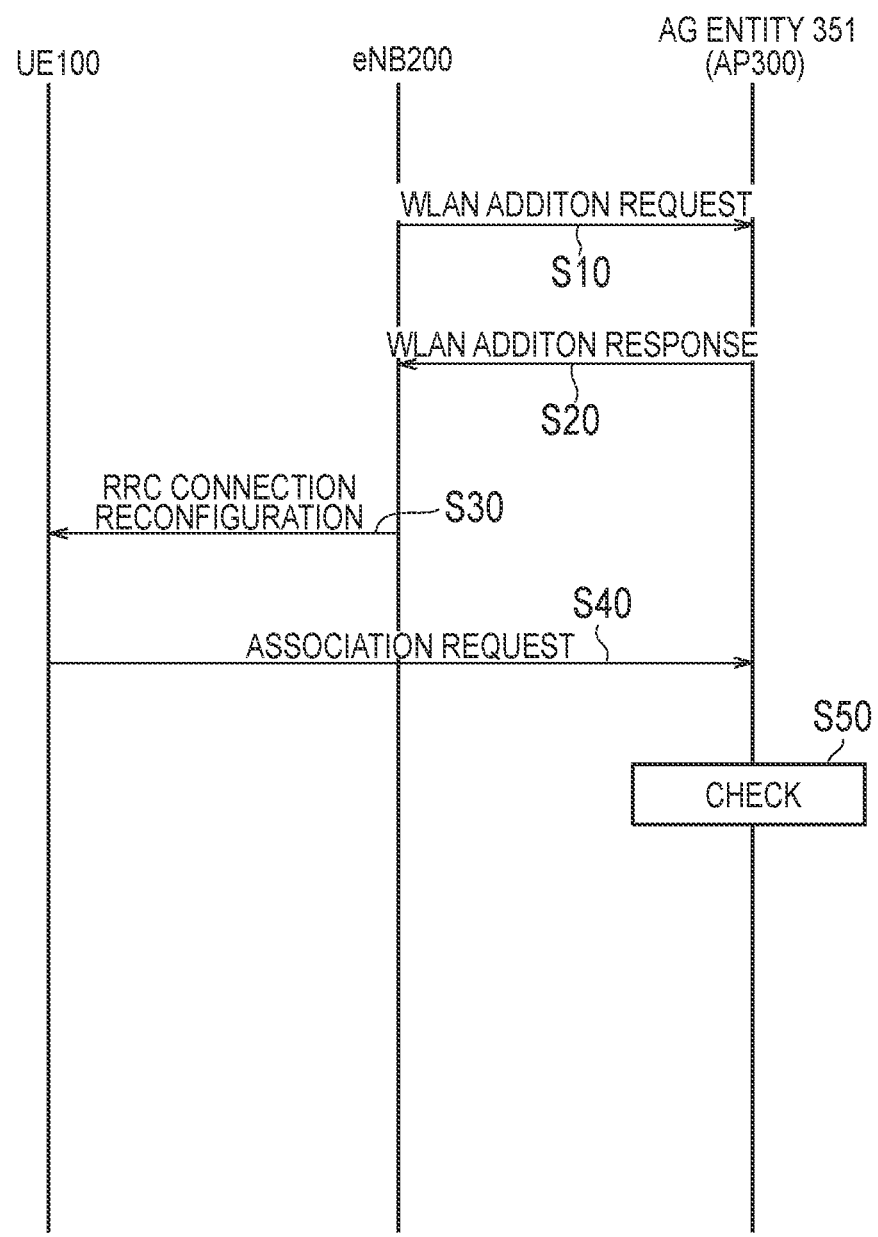

USER TERMINAL AND ACCESS POINT

RELATED APPLICATIONS

This application is a continuation application of international application PCT/JP2015/083127, filed Nov. 25, 2015, which claims benefit of JP Patent Application 2014-240646, filed Nov. 27, 2014, the entirety of all applications hereby expressly incorporated by reference.

TECHNICAL FIELD

The present disclosure relates to a user terminal and an access point that support a cellular/WLAN radio interworking technology.

BACKGROUND ART

An LTE (Long Term Evolution) of which the specifications are designed in 3GPP (3rd Generation Partnership Project), which is a project aiming to standardize a cellular communication technology, supports a cellular/WLAN radio interworking technology in Release 12 and later (see Non Patent Document 1 and 2).

Further, in order to enhance the cellular/WLAN radio interworking technology, a technology is proposed by which data of user terminal is transmitted and received by using both the cellular communication and the WLAN communication (hereinafter, referred to as "cellular/WLAN aggregation") (see Non Patent Document 3).

PRIOR ART DOCUMENT

Non-Patent Document

Non Patent Document 1: 3GPP contribution "R2-142130"
Non Patent Document 2: 3GPP contribution "R2-142949"
Non Patent Document 3: 3GPP contribution "RP-140738"

SUMMARY

A communication system according to an embodiment is a communication system in which supports cellular communication in a Long Term Evolution (LTE) system and Wireless Local Area Network (WLAN) communication. The communication system comprises: a base station; and a user terminal. The base station transmits first information to the user terminal in a state where a predetermined data bearer is established. The predetermined data bearer is a first data bearer between the base station and the user terminal. The first information is for establishing a second data bearer between the base station and the user terminal. The user terminal receives the first information from the base station in the state where the predetermined data bearer is established. The first data bearer passes through the base station without passing through an access point. The second data bearer: passes through the base station and the access point; and is for aggregation in which the cellular communication and the WLAN communication are used to communicate data of the user terminal. The first information includes a bearer identifier indicating the already established predetermined data bearer and type information associated with the bearer identifier. The user terminal starts control to change the predetermined data bearer from the first data bearer to the second data bearer if the type information indicates a change from the first data bearer to the second data bearer.

BRIEF DESCRIPTION OF THE DRAWINGS

FIG. 2 is a block diagram of a UE according to the first embodiment.
FIG. 3 is a block diagram of an eNB 200 according to the first embodiment.
FIG. 13 is a sequence diagram for describing an operation of an AG entity according to the fourth embodiment.

DESCRIPTION OF THE EMBODIMENT

Overview of Embodiment

Figure 1:
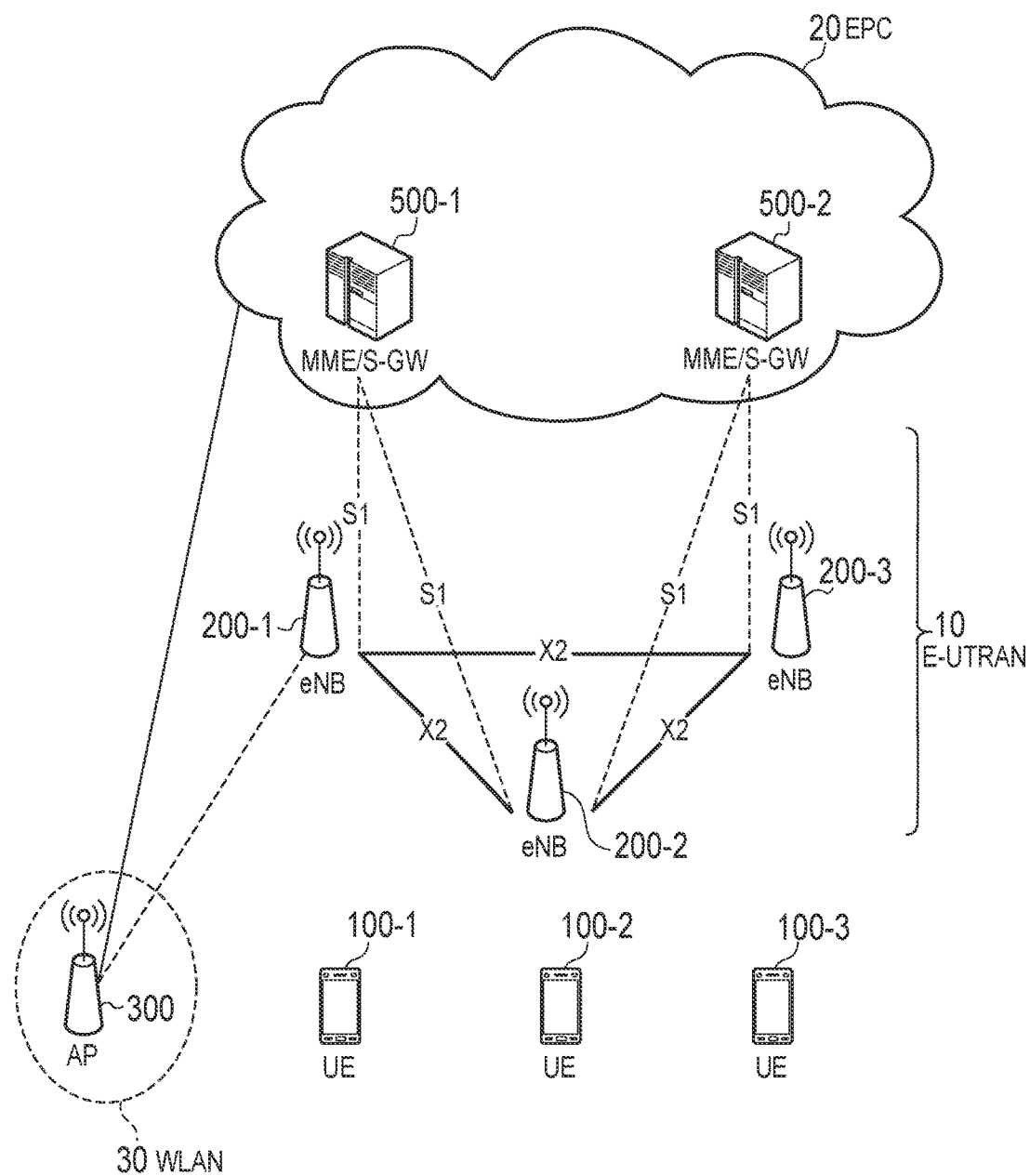
FIG. 1 is a diagram illustrating a system configuration according to a first embodiment.

The above-described cellular/WLAN aggregation is still at a conceptual stage and there are many differences from a cellular/WLAN radio interworking technology introduced in Release 12.

Therefore, an object of the present disclose is to provide a user terminal and an access point with which it is possible to realize efficient control if a cellular/WLAN aggregation is introduced.

A user terminal according to a first embodiment supports cellular communication and WLAN communication. The user terminal comprises: a receiver configured to receive, from a base station, a first message for requesting to the user terminal a configuration for executing cellular/WLAN aggregation in which data of the user terminal is transmitted and received by using both the cellular communication and the WLAN communication; and a transmitter configured to transmit, to the base station, a second message indicating that the configuration is completed. The transmitter transmits the second message if a predetermined condition about an access point configured to support the WLAN communication is satisfied.

In the first embodiment, the transmitter transmits the second message upon regarding that the predetermined condition is satisfied if a connection with the access point is completed.

In the first embodiment, the transmitter transmits the second message upon regarding that the predetermined condition is satisfied if the WLAN communication with the access point is possible after completing the connection with the access point.

In the first embodiment, the transmitter transmits the second message upon regarding that the predetermined condition is satisfied if a connection with the access point is possible on the basis of measurement about a radio signal from the access point.

In the first embodiment, the transmitter transmits the second message upon regarding that the predetermined condition is satisfied if an interference level in a frequency band utilized in the WLAN communication is less than a threshold value.

In the first and a second embodiment, the transmitter transmits, to the base station, a third message for indicating that the predetermined condition is not satisfied if the predetermined condition is not satisfied.

In the first embodiment, the third message includes a reason that the predetermined condition is not satisfied.

In the first embodiment, the transmitter does not transmit the third message until a predetermined time period elapses since receiving the first message or the number of times in which it is determined that the predetermined condition is not satisfied exceeds a predetermined value.

A user terminal according to the first and the second embodiment comprises: a controller configured to determine whether or not the WLAN communication is possible. The transmitter transmits, to the base station, if the WLAN communication is not possible or if the WLAN communication becomes not possible, after transmitting the second message, a notification indicating that the WLAN communication is not possible and/or a radio link failure report indicating that a radio link failure in the WLAN communication occurs.

In the first embodiment, the controller determines that the WLAN communication is not possible if after a connection request to the access point is transmitted, the connection request is rejected from the access point.

In the first embodiment, the first message is an RRC Connection Reconfiguration message. The second message is an RRC Connection Reconfiguration Complete message.

A user terminal according to a third embodiment supports cellular communication and WLAN communication. The user terminal comprises a controller configured to execute: control to acquire a first measurement result about a radio signal of a base station and a second measurement result about a radio signal of an access point; control to notify, if the first measurement result and the second measurement result satisfy a predetermined condition for switching a communication path from a cellular communication network to WLAN, an upper station configured to control a switching process of switching the communication path of the user terminal between the cellular communication network and the WLAN, of an identifier of the access point; and control to switch, on the basis of an instruction from the upper station that receives a notification of the identifier of the access point, from a communication path that passes through the base station to a communication path that passes through the access point. The controller executes control to notify, if a radio signal of the access point is measured on the basis of measurement configuration information from the base station, before notifying the upper layer of the identifier of the access point, the base station of the second measurement result.

In the third embodiment, the controller executes control to notify the base station of the first measurement result together with second measurement result.

In the third embodiment, the controller: executes control to notify the base station of the second measurement result if the access point is subject to a cellular/WLAN aggregation in which data of the user terminal is transmitted and received by using both the cellular communication and the WLAN communication; and executes control to notify the upper layer of the identifier of the access point if the access point is not subject to the cellular/WLAN aggregation.

In the third embodiment, the controller does not notify the upper layer of the identifier of the access point until a predetermined time period elapses since notifying the base station of the second measurement result.

In the third embodiment, the controller does not notify the upper layer of the identifier of the access point until receiving, from the base station, a message based on the notification since notifying the base station of the second measurement result.

In the third embodiment, the controller cancels to notify the upper layer of the identifier of the access point if notifying the base station of the second measurement result.

In the third embodiment, the controller executes control to measure, if the access point transmits the radio signal in each of a plurality of frequency bands, the radio signal in each of the plurality of frequency bands.

In the third embodiment, the controller further executes control to measure an interference status in a frequency band utilized in the WLAN. The controller executes control to notify the base station of a measurement result of the interference status together with the second measurement result.

In the third embodiment, the controller executes control to notify the base station of the second measurement result after a connection with the access point is completed.

An access point according to a fourth embodiment supports WLAN communication. The access point comprises: a controller configured to execute a function of an entity configured to control cellular/WLAN aggregation in which data of a user terminal is transmitted and received by using both cellular communication and the WLAN communication; and a receiver configured to receive, from a user terminal, a connection request to the access point. The entity starts, if the connection request includes predetermined information indicating that the user terminal is subject to the cellular/WLAN aggregation, the control of the cellular/WLAN aggregation, on the user terminal.

In the fourth embodiment, the access point according to the fourth embodiment further comprises: a storage unit configured to store check information assigned to a user terminal subject to the cellular/WLAN aggregation. The entity starts the control of the cellular/WLAN aggregation onto the user terminal if the predetermined information matches the check information.

In the fourth embodiment, the check information is information assigned, by the base station configured to support the cellular communication, to the user terminal. The storage unit stores the check information if receiving, from the base station, an execution request of the cellular/WLAN aggregation including the check information.

In the fourth embodiment, the entity assigns, if receiving, from the base station, an execution request of the cellular/WLAN aggregation, check information to a user terminal subject to the cellular/WLAN aggregation in the execution request, and stores the check information in the storage unit. The entity transmits, to the base station, a response, in which the check information is included, to the execution request.

In the fourth embodiment, the connection request is a request for the cellular/WLAN aggregation.

In the fourth embodiment, the predetermined information is identification information indicating a base station and/or a cell for which the user terminal performs the cellular communication in the cellular/WLAN aggregation. The entity executes, on the basis of the identification information, control to transmit and receive, with the base station, data of the user terminal in the cellular/WLAN aggregation.

A user terminal according to the fourth embodiment supports cellular communication and WLAN communication. The user terminal comprises: a transmitter configured to transmit a connection request to an access point configured to support the WLAN communication, to the access point; and a controller configured to include, if transmitting the connection request in order to execute cellular/WLAN aggregation in which data of the user terminal is transmitted and received by using both the cellular communication and the WLAN communication, predetermined information indicating that the user terminal is subject to the cellular/WLAN aggregation, into the connection request.

An access point according to the fourth embodiment supports WLAN communication. The access point comprises: a receiver configured to receive, from a base station configured to support cellular communication, an execution request of cellular/WLAN aggregation in which data of a user terminal is transmitted and received by using both the cellular communication and the WLAN communication; and a transmitter configured to transmit, only if an interference level in a frequency band utilized in the WLAN communication is less than a threshold value, an acknowledgment to the execution request.

A user terminal according to the fifth embodiment supports cellular communication and WLAN communication. The user terminal comprises: a receiver configured to receive, in a state where a first data bearer that passes through a base station without passing through an access point is established, from the base station, establishment information for establishing a second data bearer that passes through the access point and the base station, where the second data bearer is a data bearer for cellular/WLAN aggregation in which data of the user terminal is transmitted and received by using both the cellular communication and the WLAN communication; and a controller configured to start, if a bearer identifier included in the establishment information matches a bearer identifier indicating the already established first data bearer, control to release the first data bearer corresponding to the bearer identifier included in the establishment information and to newly establish a second data bearer.

In the fifth embodiment, the establishment information includes bearer type information associated with the bearer identifier. The bearer type information indicates a type of the second data bearer.

In the fifth embodiment, the receiver receives, from the base station, in a state where the second data bearer is established, release information for releasing the second data bearer. The controller starts control to release the second data bearer corresponding to a bearer identifier included in the release information and to newly establish the first data bearer.

In the fifth embodiment, the release information includes bearer type information associated with the bearer identifier. The bearer type information indicates a type of the first data bearer.

In the fifth embodiment, the receiver receives, from the base station, together with the release information for releasing the second data bearer, other release information for releasing the first data bearer. The controller starts, if the bearer identifier included in the release information matches a bearer identifier included in the another release information, control to release the second data bearer corresponding to the bearer identifier included in the release information and omits control to newly establish the first data bearer.

In the fifth embodiment, the receiver receives, in a state where the second data bearer is established, new establishment information for establishing a second data bearer. The new establishment information includes at least one of an identifier indicating another access point different from the access point and information indicating another frequency band different from a frequency band used by the access point. The controller starts, if a bearer identifier included in the new establishment information matches a bearer identifier indicating the already established second data bearer, control to release the second data bearer corresponding to the bearer identifier included in the new establishment information and to establish a new second data bearer in which the another access point or the another frequency band is utilized.

First Embodiment

Below, with reference to the figure, an embodiment in which an LTE system is a cellular communication system configured in compliance with the 3GPP standards and which is linked with a wireless LAN (WLAN) system will be described.

(System Configuration)

FIG. 1 is a system configuration diagram according to a first embodiment. As shown in FIG. 1, the LTE system includes a plurality of UEs (User Equipments) 100, E-UTRAN (Evolved-UMTS Terrestrial Radio Access Network) 10, and EPC (Evolved Packet Core) 20.

The E-UTRAN 10 corresponds to cellular RAN. The EPC 20 corresponds to a core network. The E-UTRAN 10 and the EPC 20 constitute a network of an LTE system.

The UE 100 is a mobile radio communication device. The UE 100 corresponds to a user terminal. The UE 100 is a terminal (dual terminal) that supports both a cellular communication scheme and a WLAN communication scheme.

The E-UTRAN 10 includes a plurality of eNBs 200 (evolved Node-Bs). The eNB 200 corresponds to a base station. The eNB 200 manages one or a plurality of cells and performs radio communication with the UE 100 which exists on the cell of the eNB 200. The "cell" is used as a term indicating a minimum unit of a radio communication area, and is also used as a term indicating a function of performing radio communication with the UE 100. The eNB 200 has a radio resource management (RRM) function, a routing function of user data, and a measurement control function for mobility control and scheduling.

The eNBs 200 are connected mutually via an X2 interface. The eNB 200 is connected to MME (Mobility Management Entity)/S-GW (Serving-Gateway) 500 included in the EPC 20 via an S1 interface.

The EPC 20 includes a plurality of MMEs/S-GWs 500. The MME is a network node for performing various mobility controls, for example, for the UE 100, and corresponds to a control station. The S-GW is a network node that performs transfer control of user data and corresponds to a mobile exchange center.

A WLAN 30 includes a WLAN access point (hereinafter, referred to as "AP") 300. The AP 300 is an AP (Operator controlled AP) managed by a network operator of the LTE system, for example.

The WLAN 30 is configured to comply with standards of IEEE 802.11, for example. The AP 300 performs WLAN communication with the UE 100 in a frequency band different from a cellular frequency band. Generally, the WLAN communication is performed through an unlicensed band. The cellular communication is performed through a licensed band. The AP 300 is connected to the EPC 20 via a router, etc.

In addition to a case where the eNB 200 and the AP 300 are separate nodes, the eNB 200 and the AP 300 may be "Collocated" by regarding the eNB 200 and the AP 300 as the identical node. A configuration of an eNB 200 that is a cellular/WLAN collocated eNB 200 configured to support the cellular communication and the WLAN communication (hereinafter, referred to as a "cellular/WLAN collocated eNB 200") will be described later.

Alternatively, the eNB 200 and the AP 300 may be mutually connected via a direct interface.

The EPC 20 may further include an access network discovery and selection function (ANDSF) server. The ANDSF server manages ANDSF information related to the WLAN 30. The ANDSF server provides the UE 100 with the ANDSF information related to the WLAN 30.

Subsequently, a configuration of the UE 100, the eNB 200, and the AP 300 will be described.

FIG. 2 is a block diagram of the UE 100. As illustrated in FIG. 2, the UE 100 includes: antennas 101 and 102; a cellular transceiver 111 (transmitter/receiver); a WLAN transceiver 112 (transmitter/receiver); a user interface 120; a GNSS (Global Navigation Satellite System) receiver 130; a battery 140; a memory 150; and a processor 160. The memory 150 and the processor 160 constitute a controller. The UE 100 may not have the GNSS receiver 130 and the user interface 120. Furthermore, the memory 150 may be integrally formed with the processor 160, and this set (that is, a chipset) may be called a processor 160'.

The antenna 101 and the cellular transceiver 111 are used for transmitting and receiving cellular radio signals. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used to transmit and receive a WLAN radio signal. The WLAN transceiver 112 converts a baseband signal output from the processor 160 into a WLAN radio signal, and transmits the same from the antenna 102. Further, the WLAN transceiver 112 converts a WLAN radio signal received by the antenna 102 into a baseband signal, and outputs the same to the processor 160.

The user interface 120 is an interface for use by a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for processes by the processor 160. The processor 160 includes a baseband processor that performs modulation and demodulation, encoding and decoding and the like on the baseband signal and a CPU that performs various processes by executing the program stored in the memory 150. The processor 160 may further include a codec that performs encoding and decoding on audio and video signals. The processor 160 executes various processes and various communication protocols described later.

FIG. 3 is a block diagram of the eNB 200. As illustrated in FIG. 3, the eNB 200 includes an antenna 201, a cellular transceiver (transmitter/receiver) 211, a network interface (transmitter/receiver) 220, a memory 230, and a processor 240. The memory 230 and the processor 240 constitute a control unit. Furthermore, the memory 230 may be integrally formed with the processor 240, and this set (that is, a chipset) may be called a processor.

The antenna 201 and the cellular transceiver 211 are used for transmitting and receiving a cellular radio signal. The cellular transceiver 211 converts the baseband signal output from the processor 240 into the cellular radio signal, and transmits the same from the antenna 201. Furthermore, the cellular transceiver 211 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. The network interface 220 may be connected with the AP 300 via a direct interface.

The memory 230 stores a program to be executed by the processor 240 and information to be used for a process by the processor 240. The processor 240 includes a baseband processor that performs modulation and demodulation, encoding and decoding and the like on the baseband signal and a CPU that performs various processes by executing the program stored in the memory 230. The processor 240 implements various processes and various communication protocols described later.

In addition, when the eNB 200 is a cellular/WLAN collocated-type, the eNB 200 further includes an antenna 202 and a WLAN transceiver 212. The antenna 202 and the WLAN transceiver 212 are used to transmit and receive a WLAN radio signal. The WLAN transceiver 212 converts a baseband signal output from the processor 240 into a WLAN radio signal and transmits the same from the antenna 202. Further, the WLAN transceiver 212 converts a WLAN radio signal received by the antenna 202 into a baseband signal and outputs the same to the processor 240.

Figure 4:
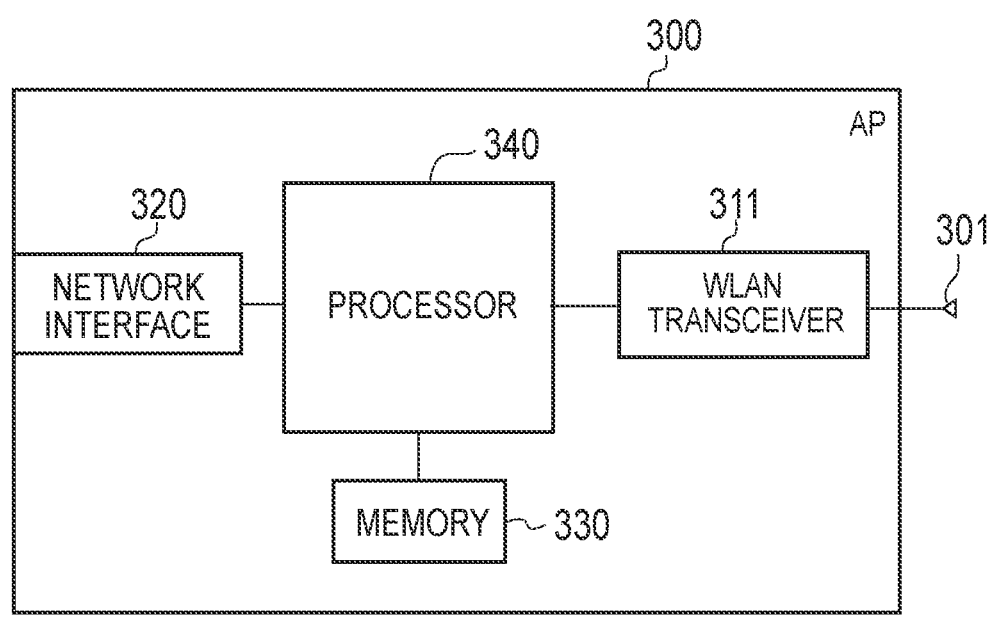
FIG. 4 is a block diagram of an AP according to the first embodiment.

FIG. 4 is a block diagram of the AP 300. As shown in FIG. 4, the AP 300 includes an antenna 301, a WLAN transceiver (transmitter/receiver) 311, a network interface (transmitter/receiver) 320, a memory 330, and a processor 340. The memory 330 and the processor 340 constitute a controller (controller). The memory 330 may be integrally formed with the processor 340, and this set (that is, a chipset) may be called a processor.

The antenna 301 and the WLAN transceiver 311 are used to transmit and receive a WLAN radio signal. The WLAN transceiver 311 converts a baseband signal output from the processor 340 into a WLAN radio signal and transmits the same from the antenna 301. Further, the WLAN transceiver 311 converts a WLAN radio signal received by the antenna 301 into a baseband signal and outputs the same to the processor 340.

The network interface 320 is connected to the eNB 200 via a direct interface.

The memory 330 stores a program to be executed by the processor 340 and information to be used for a process by the processor 340. The processor 340 includes a baseband processor that performs modulation and demodulation, encoding and decoding and the like of a baseband signal, and a CPU that performs various processes by executing the program stored in the memory 330. The processor 340 executes various processes described later.

Figure 5:
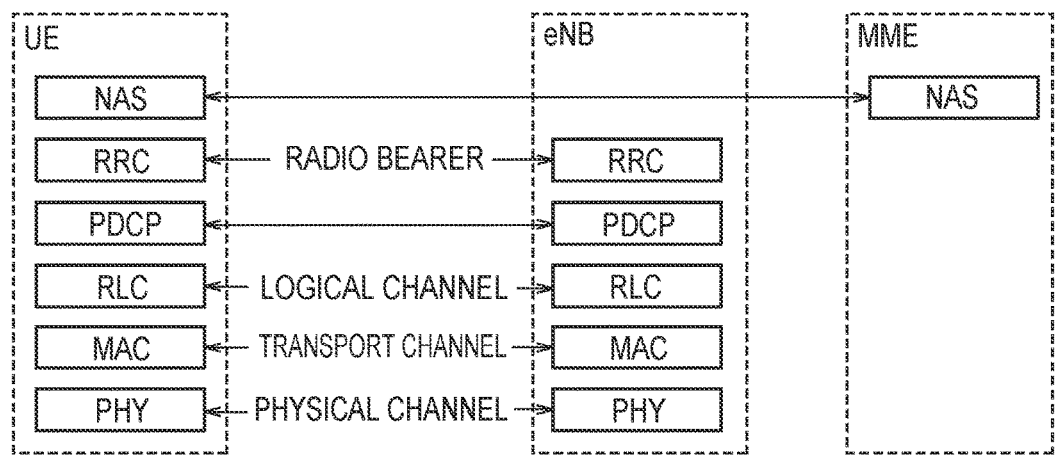
FIG. 5 is a protocol stack diagram of an LTE radio interface.

FIG. 5 is a protocol stack diagram of a radio interface in the LTE system. As shown in FIG. 5, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, user data and control signals are sent via a physical channel.

The MAC layer performs priority control of data, and a retransmission process and the like by a hybrid ARQ (HARQ). Between the MAC layer of the UE 100 and the MAC layer of the eNB 200, user data and control signals are sent via a transport channel. The MAC layer of the eNB 200 includes a scheduler for deciding a transport format (a transport block size and a modulation and coding scheme) of an uplink and a downlink, and a resource block to be assigned to the UE 100.

The RLC layer sends data to an RLC layer of a reception side by using the functions of the MAC layer and the physical layer. Between the RLC layer of the UE 100 and the RLC layer of the eNB 200, user data and control signals are sent via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (RRC message) for various types of settings is sent. The RRC layer controls the logical channel, the transport channel, and the physical channel according to the establishment, re-establishment, and release of a radio bearer. When a connection (RRC connection) is established between the RRC of the UE 100 and the RRC of the eNB 200, the UE 100 is in a RRC connected state, and when the connection is not established, the UE 100 is in an RRC idle state.

An NAS (Non-Access Stratum) layer positioned above the RRC layer performs session management, mobility management, and the like. The MME 300 transmits and receives NAS messages to and from the UE 100.

Moreover, in the LTE system, OFDMA (Orthogonal Frequency Division Multiple Access) is applied to a downlink, and SC-FDMA (Single Carrier Frequency Division Multiple Access) is applied to an uplink, respectively.

A radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol. Among radio resources allocated to the UE 100, a frequency resource can be designated by a resource block and a time resource can be designated by a subframe (or slot).

(Basic Operation of Terminal-Initiated Switching Control)

In 3GPP Release 12 and later, a cellular/WLAN radio interworking technology is supported (see Non Patent Document 1 and 2). With such a technology, the UE 100 in the RRC connected state or the RRC idle state performs a bidirectional traffic switching (network selection and traffic steering) between the E-UTRAN 10 and the WLAN 30.

The traffic switching is performed at the initiative of the UE 100 (UE based) by an aid of the E-UTRAN 10. Further, the traffic switching is performed in an APN (Access Point Name) unit. Hereinafter, such switching control is referred to as "UE-initiated switching control".

Figure 6:
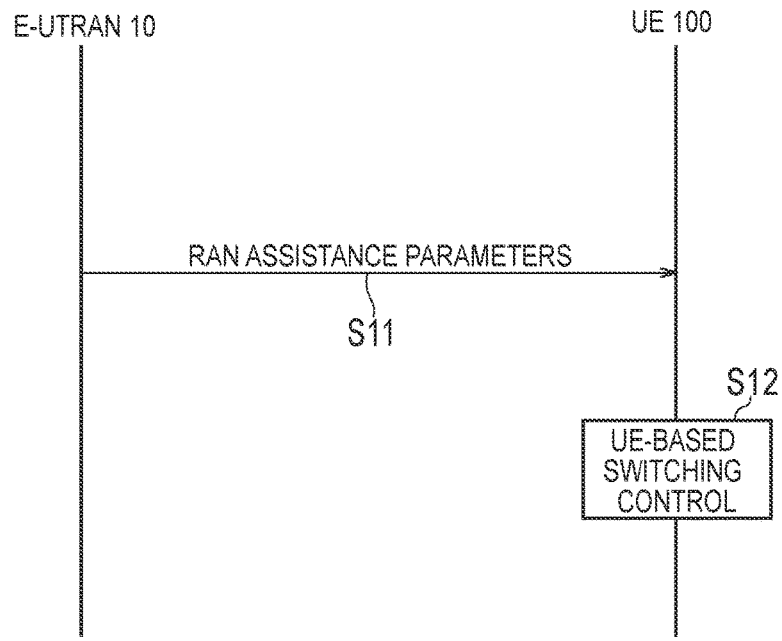
FIG. 6 is a diagram illustrating a basic operation of UE-initiated switching control according to the first embodiment.

FIG. 6 is a diagram showing a basic operation of UE-initiated switching control.

As shown in FIG. 6, in step S11, the E-UTRAN 10 transmits, to the UE 100, assistance information (RAN assistance parameters) by a broadcast RRC signaling or a dedicated RRC signaling. The broadcast RRC signaling, for example, is an SIB (System Information Block). The dedicated RRC signaling, for example, is an RRC Connection Reconfiguration message.

The assistance information includes: a strength (received power) threshold value and a quality threshold value of an E-UTRAN signal; a threshold value of a WLAN channel usage rate; a threshold value of a WLAN backhaul data rate; a strength (received power) threshold value and a quality threshold value of a WLAN signal; and the like. The assistance information may include a WLAN identifier that is a target of the UE-initiated switching control. The WLAN identifier includes SSID, BSSID, HESSID, and the like. The assistance information may include a parameter that designates a period during which a threshold value (determination condition) should be satisfied.

The UE 100 configured to support the UE-initiated switching control receives the assistance information and stores the received assistance information. When performing a cell reselection or a handover, the UE 100 may discard the stored assistance information.

In step S12, the UE 100 performs the UE-initiated switching control.

First of all, an example of a switching from the cellular communication to the WLAN communication, that is, a switching from the E-UTRAN 10 to the WLAN 30 will be described. The UE 100 performs, on the basis of a first determination condition regarding the cellular and a second determination condition regarding the WLAN, a switching determination regarding whether or not to switch from the cellular communication to the WLAN communication. Specifically, when both the first determination condition and the second determination condition are satisfied, the UE 100 performs the switching from the cellular communication to the WLAN communication.

$$RSRPmeas < Thresh_{ServingOffloadWLAN, LowP}; \text{ or}$$

$$RSRQmeas < Thresh_{ServingOffloadWLAN, LowQ}$$

Here, "RSRPmeas" is a received power of a cellular received signal, i.e., a reference signal received power (RSRP) measured at the UE 100. "RSRQmeas" is a reception quality of a cellular received signal, i.e., a reference signal reception quality (RSRQ) measured at the UE 100. "$Thresh_{ServingOffloadWLAN, LowP}$" and "$Thresh_{ServingOffloadWLAN, LowQ}$" are included in the assistance information, and are threshold values for switching to the WLAN 30.

The second determination condition is the following conditions for a target WLAN:

$$ChannelUtilizationWLAN < Thresh_{ChUtilWLAN, Low}; \text{ and}$$

$$BackhaulRateDlWLAN > Thresh_{BackhRateDLWLAN, High};$$
and

BackhaulRateUlWLAN>Thresh$_{BackhRateULWLAN,High}$;
and

BeaconRSSI>Thresh$_{BeaconRSSIWLAN,High}$

Here, "ChannelUtilizationWLAN" is included in a WLAN beacon or a probe response, and indicates a WLAN channel usage rate, i.e., a WLAN radio load level. "BackhaulRateDlWLAN" and "BackhaulRateUlWLAN" are provided from an ANQP (Access Network Query Protocol), and indicate an available transmission rate of WLAN backhaul, i.e., a WLAN backhaul load level. "BeaconRSSI" indicates received signal intensity of a beacon signal measured at the UE 100. "Thresh$_{ChUtilWLAN, Low}$", "Thresh$_{BackhRateDLWLAN, High}$", "Thresh$_{BackhRateULWLAN, High}$", and "Thresh$_{BeaconRSSIWLAN, High}$" are included in the assistance information, and are threshold values for switching to the WLAN 30.

It is noted that when performing the switching from the cellular communication to the WLAN communication, the UE 100 notifies an upper station (higher layer/upper layer) configured to perform bidirectional traffic switching control between the E-UTRAN 10 and the WLAN 30 of, together with a list (list of WLAN identifiers) of identifiers of the AP 300 (WLAN identifier) that satisfies the second determination condition, information indicating the traffic switching to the WLAN communication (move-traffic-to-WLAN indication). Specifically, an AS layer in the UE 100 notifies an NAS layer in the UE 100 of the WLAN identifier (and the information), and the NAS layer in the UE 100 uses an NAS procedure to notify the upper station (MME). The UE 100 executes control, on the basis of an instruction from the upper station that receives the notification of the WLAN identifier, of switching from the cellular communication to the WLAN communication (switching from a communication path through the eNB 200 and a communication path through the AP 300).

Next, an example of a switching from the WLAN communication to the cellular communication, that is, a switching from the WLAN 30 to the E-UTRAN 10 will be described. The UE 100 performs, on the basis of a third determination condition regarding the cellular and a fourth determination condition regarding the WLAN, a switching determination regarding whether or not to switch from the WLAN communication to the cellular communication. Specifically, when one of the third determination condition and the fourth determination condition is satisfied, the UE 100 performs the switching from the WLAN communication to the cellular communication.

The third determination condition is the following conditions for an E-UTRAN target cell:

RSRPmeas>Thresh$_{ServingOffloadWLAN,HighP}$; and

RSRQmeas>Thresh$_{ServingOffloadWLAN,HighQ}$

Here, "Thresh$_{ServingOffloadWLAN, HighP}$" and "Thresh$_{ServingOffloadWLAN, HighQ}$" are included in the assistance information, and are threshold values for switching to the E-UTRAN 10.

The fourth determination condition is the following conditions for a source WLAN:

ChannelUtilizationWLAN>Thresh$_{ChUtilWLAN,High}$; or

BackhaulRateDlWLAN<Thresh$_{BackhRateDLWLAN,Low}$; or

BackhaulRateUlWLAN<Thresh$_{BackhRateULWLAN,Low}$; or

BeaconRSSI<Thresh$_{BeaconRSSIWLAN,Low}$

Here, "Thresh$_{ChUtilWLAN, High}$", "Thresh$_{BackhRateDLWLAN, Low}$", "Thresh$_{BackhRateULWLAN, Low}$", and "Thresh$_{BeaconRSSIWLAN, Low}$" are included in the assistance information, and are threshold values for switching to the E-UTRAN 10.

(Basic Operation of Cellular/WLAN Aggregation)

Figure 7:
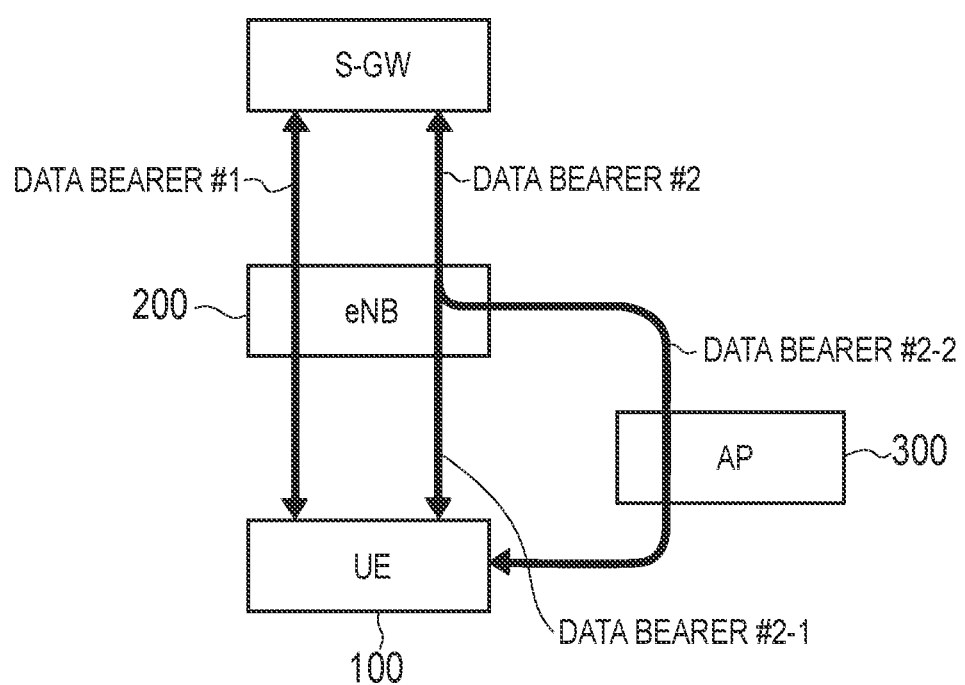
FIG. 7 is a diagram illustrating a basic operation of cellular/WLAN aggregation according to the first embodiment.

A basic operation of the cellular/WLAN aggregation will be described by using FIG. 7. FIG. 7 is a diagram illustrating the basic operation of the cellular/WLAN aggregation.

The cellular/WLAN aggregation is a communication scheme in which data (traffic) of the UE 100 is transmitted and received by using both the cellular communication and the WLAN communication. Specifically, in the cellular/WLAN aggregation, traffic (user data) belonging to an identical or different data bearer is transmitted and received by using both the cellular communication and the WLAN communication.

In FIG. 7, between the UE 100 and the S-GW 500 (EPC 20), a data bearer #1 (first data bearer) that does not pass through the AP 300 but passes through the eNB 200, and a data bearer #2 (second data bearer) that passes through the AP 300 and the eNB 200, are established. It is noted that if the cellular/WLAN aggregation is executed, the data bearer #2 only may be established, and both the data bearer #1 and the data bearer #2 may be established.

The data bearer #1 is a data bearer for a normal cellular communication. On the other hand, the data bearer #2 is a data bearer for the cellular/WLAN aggregation. The data bearer #2 is split in the eNB 200 (for example, the PDCP layer). One of the split bearers (data bearer #2-1) is terminated at the UE 100 that does not pass through the AP 300, and the other (data bearer #2-2) is terminated at the UE 100 that passes through the AP 300. It is noted that the data bearer #2-2 may be terminated at the UE 100 by passing not only through the AP 300 but also through WLAN GW (gateway device) configured to accommodate the (plurality of) APs 300.

The UE 100 transmits and receives the data by using at least the data bearer #2 if the cellular/WLAN aggregation is executed.

Specifically, if the cellular/WLAN aggregation is executed, the eNB 200 divides, in the downlink, the data belonging to the data bearer #2, into data transmitted by the cellular communication (cellular-side data) and data transmitted by the WLAN communication (WLAN-side data). The eNB 200 transmits, by the cellular communication, the cellular-side data to the UE 100 by the data bearer #2-1. On the other hand, the eNB 200 transmits to the AP 300, by using a direct communication pathway, the WLAN-side data. The AP 300 transmits, by the WLAN communication, the WLAN-side data received from the eNB 200, to the UE 100, by the data bearer #2-2.

On the other hand, in the uplink, the UE 100 divides the data belonging to the data bearer #2, into data transmitted by the cellular communication (cellular-side data) and data transmitted by the WLAN communication (WLAN-side data). The UE 100 transmits, by the cellular communication, the cellular-side data to the eNB 200 by the data bearer #2-1. On the other hand, the UE 100 transmits, by the WLAN communication, the WLAN-side data, to the AP 300, by the data bearer #2-2. The AP 300 transmits, by using a direct communication pathway, the WLAN-side data received from the UE 100, to the eNB 200. The eNB 200 combines (reassembles) the cellular-side data received from the UE 100 and the WLAN-side data received from the AP 300, and transmits the resultant data to the S-GW 500.

It is noted that in the cellular/WLAN aggregation, all the data belonging to the data bearer #2 may be transmitted and received by the cellular communication and all the data belonging to the data bearer #2 may be transmitted and received by the WLAN communication.

Further, description proceeds with a case where the eNB 200 and the AP 300 are separated; however, the eNB 200 may be the cellular/WLAN collocated-type eNB 200.

(Operation According to First Embodiment)

Figure 8:
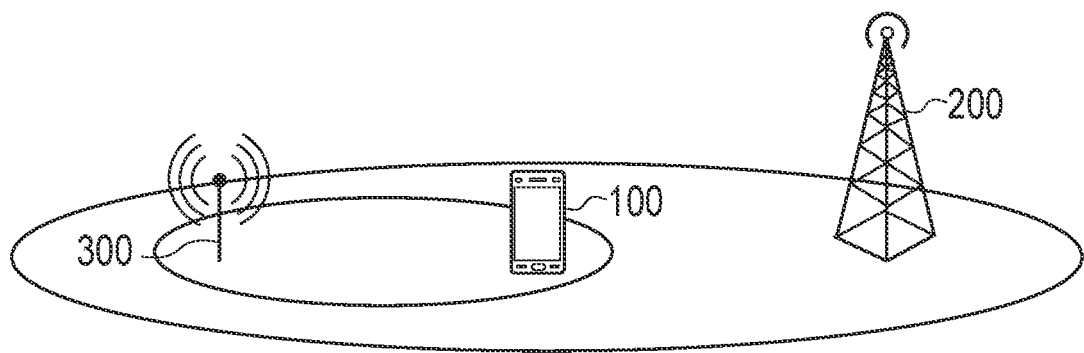
FIG. 8 is a diagram for describing an operation environment according to the first embodiment.
Figure 9:
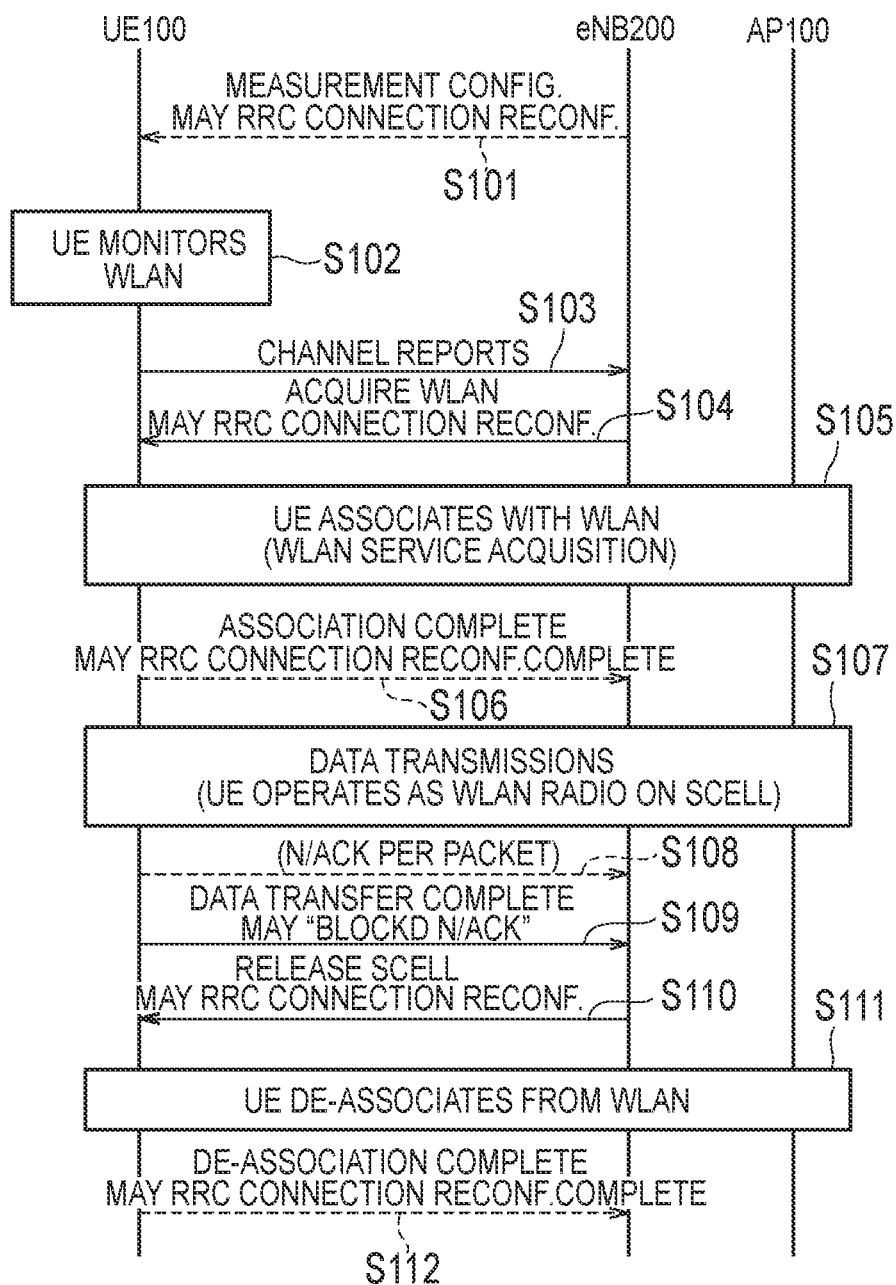
FIG. 9 is a sequence diagram for describing an operation according to the first embodiment.

Next, an operation according to the first embodiment will be described by using FIG. 8 and FIG. 9. FIG. 8 is a diagram for describing an operation environment according to the first embodiment. FIG. 9 is a sequence diagram for describing an operation according to the first embodiment.

As illustrated in FIG. 8, the UE 100 in the RRC connected state or the RRC idle state is located in a cell of the eNB 200 and the UE 100 is located in a coverage of the AP 300. A whole of the coverage of the AP 300 may overlap a cell (coverage) of the eNB 200, and a part of the coverage of the AP 300 may overlap the cell (coverage) of the eNB 200. Between the eNB 200 and the AP 300, a direct communication pathway (interface) that does not pass through the core network is arranged. The eNB 200 and the AP 300 are capable of exchanging information by using the direct communication pathway.

As illustrated in FIG. 9, in step S101, the eNB 200 is capable of transmitting, to the UE 100, measurement configuration information (Measurement Configuration) for measuring a radio signal from the AP 300. The eNB 200 may transmit the measurement configuration information by the RRC Connection Reconfiguration message. Alternatively, the eNB 200 may transmit the measurement configuration information by an SIB. The UE 100 performs setting, on the basis of the measurement configuration information, for measuring the radio signal from the AP 300, and starts a process in step S102.

It is noted that the eNB 200 may transmit, to the UE 100, instead of the measurement configuration information, assistance information (RAN assistance parameters).

It is noted that step S101 may be omitted. In this case, the UE 100 autonomously starts a process in step S102.

In step S102, the UE 100 measures the radio signal from the AP 300. For example, the UE 100 measures information indicating a received strength of the radio signal from the AP 300 (RCPI: Received Channel Power Indicator), information indicating a reception quality of the radio signal from the AP 300 (RSNI: Received Signal to Noise Indicator), information indicating a received power of a beacon signal (pilot signal) transmitted by the AP 200 (Beacon RS SI), and the like. As a result, the UE 100 acquires a measurement result about the radio signal from the AP 300.

It is noted that the UE 100 may perform a carrier sense to measure an interference status in a WLAN frequency band available for the WLAN communication with the AP 300 to acquire a carrier sense result. Further, the UE 100 may measure the radio signal from the eNB 200.

In step S103, the UE 100 transmits Channel Reports, to the eNB 200. The Channel Reports may be an indicator indicating that a condition set by the measurement configuration information is satisfied, and may be a measurement result about the radio signal from the AP 300. The indicator may include (a list of) WLAN identifiers indicating the AP 300 that measures the radio signal from the UE 100.

The eNB 200 determines on the basis of the Channel Reports received from the UE 100 whether or not to urge the UE 100 to execute the cellular/WLAN aggregation. The eNB 200 determines, if the RCPI is equal to or more than a predetermined value, for example, that the UE 100 is urged to execute the cellular/WLAN aggregation. The eNB 200 executes a process in step S104 if determining that the UE 100 is urged to execute the cellular/WLAN aggregation. Further, in consideration of a state of the AP 300 corresponding to the WLAN identifier (for example, throughput of the AP 300, a load of the AP 300, and the like), the eNB 200 may select the AP 300 on which the cellular/WLAN aggregation is to execute.

In step S104, the eNB 200 transmits to the UE 100 a reconfiguration message (Acquire WLAN) to request the UE 100 a setting for executing the cellular/WLAN aggregation. The eNB 200 may transmit the reconfiguration message by the RRC Connection Reconfiguration message. The UE 100 receives the reconfiguration message from the eNB 200.

The UE 100 performs, on the basis of the configuration information included in the reconfiguration message, the setting for executing the cellular/WLAN aggregation. For example, the UE 100 sets, on the basis of the WLAN identifier included in the configuration information, the AP 300 subject to the WLAN communication in the cellular/WLAN aggregation.

Transmission by the UE 100 of a reconfiguration completion message to the eNB 200 is not triggered solely by completion of the configuration that is based on the configuration information included in the reconfiguration message. If it is possible to configure the cellular/WLAN aggregation, that is, if a predetermined condition about the AP 300 described below is satisfied, the UE 100 transmits the reconfiguration completion message to the eNB 200. It is noted that the reconfiguration completion message is a response to the reconfiguration message, and is a message indicating that the configuration is completed.

Here, the UE 100 determines in any one of the following cases that it is possible to configure the cellular/WLAN aggregation.

Firstly, the UE 100 determines that it is possible to configure the cellular/WLAN aggregation if a connection (Association) with the AP 300 is completed. Therefore, the predetermined condition is that the UE 100 completes the connection (Association) with the AP 300.

Secondly, the UE 100 determines that it is possible to configure the cellular/WLAN aggregation if after the connection with the AP 300 is completed, the WLAN communication with the AP 300 is possible. For example, the UE 100 determines that the WLAN communication with the AP 300 is possible if after the connection with the AP 300 is completed, establishment of a radio link is confirmed after predetermined data communication is performed. Therefore, the predetermined condition is that the WLAN communication with the AP 300 is possible after the UE 100 completes the connection with the AP 300.

Thirdly, the UE 100 determines that it is possible to configure the cellular/WLAN aggregation if it is determined on the basis of a measurement about the radio signal from the AP 300 that the connection with the AP 300 is possible. Therefore, the predetermined condition is that the UE 100 is capable of connection with the AP 300 on the basis of the measurement about the radio signal from the AP 300. For example, the UE 100 determines that the connection with the AP 300 is possible if the following conditions are satisfied.

BeaconRSSI>$\alpha$(threshold value)

RCPI>$\beta$(threshold value)

RSNI>$\gamma$(threshold value)

BSSLoad(the number of UEs connected to the AP 300)>$\delta$(threshold value)

It is noted that in the first and second cases, it is determined that it is possible to configure the cellular/WLAN aggregation after authentication or the like of an upper layer of the AP 300 is considered. On the other hand, in this third case, it is determined that it is possible to configure the cellular/WLAN aggregation if the connection by way of radio with the AP 300 is possible.

Fourthly, the UE 100 determines that it is possible to configure the cellular/WLAN aggregation if an interference level in the WLAN frequency band is less than a threshold value. Therefore, the predetermined condition is that the interference level in the WLAN frequency band is less than a threshold value. For example, the UE 100 determines on the basis of the carrier sense result whether or not the interference level is less than a threshold value.

Thus, transmission by the UE 100 of the reconfiguration completion message to the eNB 200 is not triggered solely by completion of the configuration, but if it is possible to configure the cellular/WLAN aggregation after the completion of the configuration, the reconfiguration completion message is transmitted to the eNB 200. As a result, the UE 100 transmits the reconfiguration message if the connection between the UE 100 and the AP 300 is made possible or there is a good prospect for the connection between the UE 100 and the AP 300. Thus, the UE 100 is capable of omitting another notification to the eNB 200 if the connection between the UE 100 and the AP 300 is made possible for the cellular/WLAN aggregation.

On the other hand, if determining that it is not possible to configure the cellular/WLAN aggregation, the UE 100 transmits, to the eNB 200, a response to the reconfiguration message, that is, a failure message indicating that it is not possible to configure the cellular/WLAN aggregation. Alternatively, the UE 100 may transmit, as the failure message, RRCConnectionReestablishmentRequest to the eNB 200. Further, the failure message may include a reason (Cause) for not being able to configure the cellular/WLAN aggregation (for a predetermined condition not to be satisfied). For example, the failure message includes, as the reason, a case where it is determined that it is not possible to configure the cellular/WLAN aggregation, out of the first to fourth cases. Therefore, the UE 100 that receives a response indicating a connection rejection from the AP 300 is capable of transmitting to the eNB 200 the failure message including the reason, that is, it is not possible to connect to the AP 300.

Further, the UE 100 may not transmit the failure message until a predetermined time period elapses since receiving the reconfiguration message, or until the number of times in which being impossible to configure the cellular/WLAN aggregation is determined (predetermined condition is not satisfied) exceeds s predetermined value. The UE 100 is capable of continuing an attempt to enable configuration of the cellular/WLAN aggregation until transmitting the failure message since receiving the reconfiguration message.

The reconfiguration message may include information indicating a timer configured to measure a predetermined time period. The timer is activated since the UE 100 receives the reconfiguration message, and expires after a predetermined time period elapses.

Further, the reconfiguration message may include information indicating a predetermined value. The UE 100 starts, since receiving the reconfiguration message, counting the number of times in which being impossible to configure the cellular/WLAN aggregation is determined. The UE 100 is capable of counting at least any one of the following number of times of failures.

Number of times of failures to connect to the AP 300 (Association) (number of times of attempts)

Number of times in which the WLAN communication is not possible (number of times of attempts)

Number of times in which being impossible to connect to the AP 300 is determined on the basis of the measurement about the radio signal from the AP 300 (number of times of attempts)

Number of times in which the interference level based on the carrier sense results is equal to or more than a threshold value (number of times of attempts)

Thus, the UE 100 does not transmit the failure message until a predetermined time period elapses since receiving the reconfiguration message, or the count in which being impossible to configure the cellular/WLAN aggregation is determined exceeds a predetermined value, to thereby increase a probability in which it is possible to execute the cellular/WLAN aggregation.

In step S105, the UE 100 executes a process for connecting to the AP 300. Specifically, the UE 100 transmits to the AP 300 a connection request (Association request) for connecting to the AP 300. The AP 300 transmits an acknowledgment to the UE 100 if admitting the connection request. On the other hand, the AP 300 transmits a negative acknowledgment to the UE 100 if rejecting the connection request.

It is noted that if receiving, after transmitting the reconfiguration message, the negative acknowledgment indicating the rejection of the connection request from the AP 100, the UE 100 may transmit, considering that the WLAN communication is impossible, a notification indicating that the WLAN communication is impossible and/or a radio link failure report indicating that a radio link failure in the WLAN communication occurs, to the eNB 200. As a result, the eNB 200 knows that the connection between the UE 100 and the AP 300 is not established.

In step S106, the UE 100 is capable of transmitting, to the eNB 200, connection complete information (Association Complete) indicating that the connection with the AP 300 is completed. As described above, after completing the connection with the AP 300 as a result of S105, the UE 100 is capable of transmitting a reconfiguration completion message (RRC Connection Reconfiguration Complete) including the connection complete information.

In step S107, the UE 100 transmits and receives the data of the UE 100 by the cellular/WLAN aggregation.

In step S108, if successfully receiving the data (packet), the UE 100 is capable of transmitting an acknowledgment (ACK) to the eNB 200, and if failing to receive the data (packet), the UE 100 is capable of transmitting a negative acknowledgment (Nack) to the eNB 200. The UE 100 is capable of transmitting, to the eNB 200, an acknowledgment/negative acknowledgment about a success/failure of reception of the data from the AP 300.

In step S109, if the reception of all the data is completed, the UE 100 transmits a data transfer completion message (Data Transfer Complete) to the eNB 200. The UE 100 may transmit, to the eNB 200, the acknowledgment/negative acknowledgment about the success/failure of reception, rather than for each packet, of a cluster of the data.

In step S110, if receiving the data transfer completion message, the eNB 200 transmits, to the UE 100, release information (Release Scell) used for ending the cellular/WLAN aggregation. The eNB 200 may transmit the release information by the RRC Connection Reconfiguration message.

In step S111, the UE 100 that receives the release information executes a process for releasing the connection with the AP 300.

In step S112, the UE 100 is capable of transmitting, after releasing the connection with the AP 300, to the eNB 200, as a response to the RRC Connection Reconfiguration message, connection release information (D-association Complete) indicating that the connection with the AP 300 is released.

Second Embodiment

Next, a second embodiment will be described. In the second embodiment, a radio link failure report (W-RLF report) about a radio link failure (W-RLF) will be described in detail. Description of parts similar to the first embodiment will be omitted where appropriate.

In the above-described first embodiment, if after the reconfiguration completion message is transmitted (and before the WLAN communication is started), the WLAN communication is impossible, the UE 100 transmits the W-RLF report to the eNB 200. On the other hand, if after the reconfiguration completion message is transmitted, the WLAN communication is impossible (that is, W-RLF occurs), the UE 100 may transmit the W-RLF report to the eNB 200.

A case will be described, below, where the UE 100 determines that the W-RLF occurs. It is noted that the UE 100 may determine on the basis of the following contents that the WLAN communication is impossible.

Firstly, the UE 100 is capable of determining, on the basis of an interference state of a WLAN frequency band in the WLAN communication, that the W-RLF has occurred.

First of all, the UE 100 performs "carrier sense" that measures the interference state of the WLAN frequency band in the WLAN communication. As a result of performing the carrier sense, when an interference power amount in the WLAN frequency band is equal to or above a predetermined value, the UE 100 activates a timer. While continuing the carrier sense, when the interference power amount is equal to or above the predetermined value after the timer expires, the UE 100 determines that the WRLF has occurred. It is noted that when the interference power amount becomes less than the predetermined value before the timer expires, the UE 100 determines that the W-RLF is not occurred and resets the timer. It is noted that the eNB 200 may transmit, to the UE 100, configuration information for setting the predetermined value.

Alternatively, the UE 100 increases a counter by one every time the interference power amount in the WLAN frequency band is equal to or above the predetermined value when preforming the carrier sense. When the counter reaches a threshold value, the UE 100 determines that the W-RLF has occurred. It is noted that when the interference power amount becomes less than the predetermined value before the counter reaches the threshold value, the UE 100 determines that the W-RLF is not occurred and resets the counter. It is noted that the eNB 200 may transmit, to the UE 100, configuration information for setting the threshold value.

Secondly, the UE 100 is capable of determining, on the basis of a failure in transmission and reception in the WLAN communication in the cellular/WLAN aggregation, that the W-RLF has occurred.

First of all, when a reception (or transmission) of data fails, the UE 100 activates a timer. When the reception (or transmission) of data fails after the timer expires, the UE 100 determines that the W-RLF has occurred. It is noted that when the reception (or transmission) of data succeeds before the timer expires, the UE 100 determines that the W-RLF is not occurred and resets the timer. It is noted that the eNB 200 may transmit, to the UE 100, setting information for setting a value of the timer.

Alternatively, the UE 100 increases the counter by one when the reception (or transmission) of data fails. When the counter reaches a threshold value, the UE 100 determines that the W-RLF has occurred. It is noted that when the reception (or transmission) of data succeeds before the counter reaches the threshold value, the UE 100 determines that the W-RLF is not occurred and resets the counter. It is noted that the eNB 200 may transmit, to the UE 100, configuration information for setting the threshold value.

Thirdly, the UE 100 activates the timer when the received strength (desired wave power value: for example, Beacon RSSI (Received Signal Strength Indicator), RCPI (Received Channel Power Indicator), RSNI (Received Signal Noise Indicator) etc.) of a radio signal from the AP 300 performing the WLAN communication in the cellular/WLAN aggregation (or the cellular/WLAN collocated eNB 200) falls below the threshold value. When the received strength of a radio signal falls below the threshold value after the timer expires, the UE 100 determines that the W-RLF has occurred. It is noted that when the received strength of a radio signal exceeds the threshold value before the timer expires, the UE 100 determines that the W-RLF is not occurred and resets the timer. It is noted that the eNB 200 may transmit, to the UE 100, configuration information for setting the threshold value.

Alternatively, the UE 100 increases the counter by one when the received strength (Beacon RSSI) of a radio signal from the AP 300 performing the WLAN communication in the cellular/WLAN aggregation (or the cellular/WLAN collocated eNB 200) falls below the threshold value. When the counter reaches a threshold value, the UE 100 determines that the W-RLF has occurred. It is noted that when the received strength (Beacon RSSI) of a radio signal exceeds the threshold value before the counter reaches the threshold value, the UE 100 determines that the W-RLF is not occurred and resets the counter. It is noted that the eNB 200 may transmit, to the UE 100, configuration information for setting the threshold value.

Fourthly, when a connection with the AP 300 performing the WLAN communication in the cellular/WLAN aggregation is disconnected, the UE 100 determines that the W-RLF has occurred. When a connection with the AP 300 is established again, the UE 100 determines that the W-RLF is recovered.

Fifthly, the UE 100 activates the timer when a backhaul rate of the AP 300 performing the WLAN communication in the cellular/WLAN aggregation falls below a threshold value. When the backhaul rate falls below the threshold value after the timer expires, the UE 100 determines that the W-RLF has occurred. It is noted that when the backhaul rate becomes equal to or above the threshold value before the timer expires, the UE 100 determines that the W-RLF is not occurred and resets the timer. It is noted that the eNB 200 may transmit, to the UE 100, configuration information for setting a value of the timer.

Alternatively, the UE 100 increases the counter by one when the backhaul rate falls below the threshold value. When the counter reaches a threshold value, the UE 100 determines that the W-RLF has occurred. It is noted that when the backhaul rate becomes equal to or above the threshold value before the counter reaches the threshold value, the UE 100 determines that the W-RLF has not occurred and resets the counter. It is noted that the eNB 200 may transmit, to the UE 100, configuration information for setting the threshold value.

When determining that the W-RLF has occurred, the UE 100 transmits by an RRC message, to the eNB 200, a radio link failure report regarding the W-RLF (hereinafter, a "W-RLF report"). The W-RLF report may include information of at least any one of: a reason by which the W-RLF is determined to occur; and the most recent measurement result regarding the WLAN communication measured by the UE 100 (for example, a result of carrier sense, a measurement result of Beacon RSSI, a measurement result of RCPI, a measurement result of RSNI, etc.). It is noted that the reason by which the W-RLF is determined to occur is, for example, the W-RLF report is at least any one of: the interference state of the WLAN frequency band in the WLAN communication; a failure in transmission and reception in the WLAN communication; the received strength of a radio signal from the AP 300 performing the WLAN communication; and disconnection from the AP 300.

The eNB 200 receives the W-RLF report from the UE 100, during the execution (control) of the cellular/WLAN aggregation. For example, the eNB 200 transmits, on the basis of the W-RLF report, to the AP 300 under the execution of the cellular/WLAN aggregation, information for releasing a data bearer for the WLAN communication in the cellular/WLAN aggregation (WLAN Release Request), or information for changing the data bearer for the WLAN communication in the cellular/WLAN aggregation to another data bearer (WLAN Modification Request). The AP 300 that has received the WLAN Release Request releases the data bearer for the WLAN communication in the cellular/WLAN aggregation. On the other hand, the AP 300 that has received the WLAN Modification Request starts control for changing the data bearer for the WLAN communication in the cellular/WLAN aggregation to another data bearer. For example, when executing the cellular/WLAN aggregation in a WLAN frequency band 1, the AP 300 performs the carrier sense, and starts control for executing the cellular/WLAN aggregation in a WLAN frequency band 2 of which the interference power amount is less than the threshold value.

When a change (or release) of the data bearer for the WLAN communication in the cellular/WLAN aggregation is performed, the eNB 200 transmits, to the UE 100, an RRC Connection Reconfiguration message for notifying the UE 100 of the change (or release) of the data bearer.

Further, the eNB 200 may transmit the W-RLF report to the AP 300 under the execution of the cellular/WLAN aggregation. The AP 300 is capable of (temporarily) stopping the WLAN communication in the cellular/WLAN aggregation on the basis of the W-RLF report. When the carrier sense is performed and then the interference power amount becomes less than the threshold value, the AP 300 is capable of restarting the WLAN communication in the cellular/WLAN aggregation. It is noted that the AP 300 is capable of deciding and setting (adjusting), on the basis of the W-RLF report, a parameter (for example, a timer for detecting the W-RLF, a threshold value for detecting the W-RLF).

Here, the eNB 200 transmits, to the AP 300, downlink data scheduled to be transmitted to the UE 100 by the WLAN communication in the cellular/WLAN aggregation via a direct communication pathway, for example. Before the W-RLF occurs, the AP 300 transmits, to the UE 100, downlink data scheduled to be transmitted to the UE 100 received from the eNB 200. On the other hand, when the W-RLF occurs, there is high possibility that the UE 100 is not capable of receiving the downlink data even though the AP 300 transmits the downlink data to the UE 100.

Therefore, when the W-RLF occurs, the AP 300 may transmit, to the eNB 200, downlink data that is not transmitted to the UE 100. When releasing the data bearer for the WLAN communication in the cellular/WLAN aggregation, the AP 300 may transmit (transfer), to the eNB 200, downlink data that is not transmitted to the UE 100. Alternatively, when the eNB 200 has deleted (flashed) downlink data having transmitted to the AP 300 (when the eNB 200 does not store downlink data transmitted to the AP 300), the eNB 200 may perform control to transmit, to the AP 300, a transmission request of downlink data that is not transmitted to the UE 100. The eNB 200 may include the transmission request of downlink data into the WLAN Release Request, the WLAN Modification Request, etc., for example. Alternatively, the eNB 200 may include the transmission request of downlink data into UE Context Release requiring a release of information of the UE 100 that becomes a target of the cellular/WLAN aggregation. When receiving the transmission request of downlink data, the AP 300 may transmit (transfer) untransmitted downlink data to the eNB 200. The eNB 200 transmits, to the UE 100, the untransmitted downlink data received from the AP 300.

It is noted that when determining that the W-RLF has occurred, the UE 100 may transmit, to the eNB 200, control information (Control PDU, for example, PDCP/RLC Status PDU) for informing the eNB 200 of data not received (or not transmitted) (or, data received (or transmitted)). The eNB 200 performs, on the basis of the control information, control to transmit (or receive) corresponding data to the UE 100.

Further, when determining that the W-RLF is recovered (the W-RLF has not occurred for a predetermined period), the UE 100 may transmit, to the eNB 200, a radio link failure recovered report (hereinafter, a "W-RLR (WLAN Radio Link Recovered) report") indicating that a radio link failure in the WLAN communication is recovered. For example, when determining, on the basis of the above-described W-RLF determination standard, that the W-RLF has not occurred for a predetermined period, the UE 100 is capable of transmitting the W-RLR report to the eNB 200. When receiving the W-RLR report, the eNB 200 is capable of grasping a radio link state in the WLAN communication. As a result, the eNB 200 is capable of appropriately performing control of the configuration regarding the cellular/WLAN aggregation, and thus, it is possible to efficiently control the cellular/WLAN aggregation.

Modification of Second Embodiment

Next, a modification of the second embodiment will be described. In the modification of the second embodiment, a case in which the AP 300 under the execution of the cellular/WLAN aggregation determines that the W-RLF has occurred will be described. A description of parts similar to the UE 100 will be omitted, where necessary.

When determining that the W-RLF has occurred, the AP 300 transmits, to the eNB 200, the W-RLF report by using a direct communication pathway, for example. Similarly to the above-described UE 100, the AP 300 is capable of determining that the W-RLF has occurred. The W-RLF report may include information of at least any one of: a reason by which the W-RLF is determined to occur; and the most recent measurement result regarding the WLAN communication measured by the AP 300 (for example, a result of carrier sense, a received strength of a reference signal from the UE 100, etc.).

The eNB 200 that has received the W-RLF report may transmit, to the AP 300, the WLAN Release Request or the WLAN Modification Request, as a response to the W-RLF report. Further, the eNB 200 that has received the W-RLF report may transmit, to the AP 300, a response to the W-RLF report including a transmission request of downlink data that is not transmitted to the UE 100.

Further, when determining that the W-RLF has occurred, the AP 300 may transmit, to the eNB 200, a request for releasing the data bearer for the WLAN communication in the cellular/WLAN aggregation (WLAN Release Required) or a request for changing the data bearer for the WLAN communication in the cellular/WLAN aggregation to another data bearer (WLAN Modification Required) by using a direct communication pathway, for example. In this case, the AP 300 may omit the transmission of the W-RLF report.

The eNB 200 may transmit, on the basis of the WLAN Release Required, the WLAN Release Request to the AP 300. Further, the eNB 200 may transmit, on the basis of the WLAN Modification Required, the WLAN Modification Request to the AP 300.

It is noted that similarly to the above-described UE 100, when determining that the W-RLF has not occurred for a predetermined period, the AP 300 may transmit the W-RLR report to the eNB 200.

Third Embodiment

Figure 10:
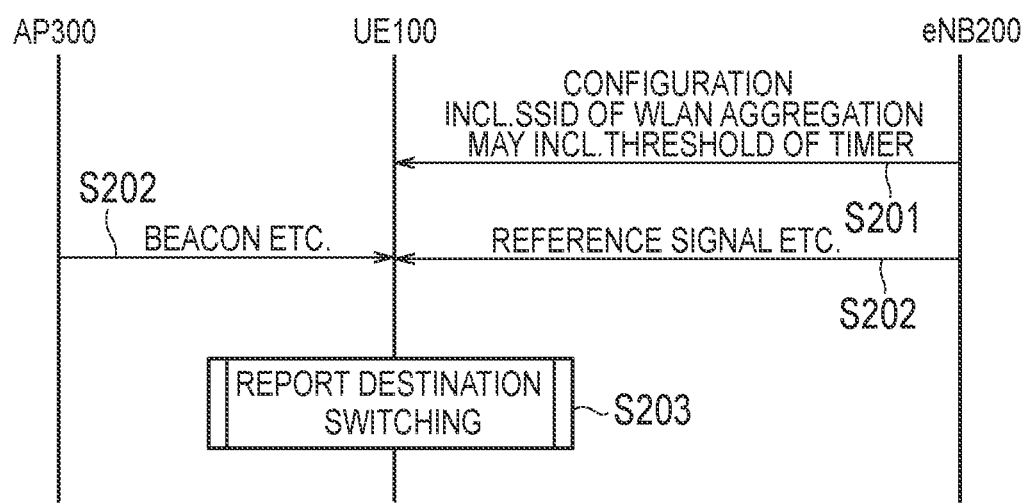
FIG. 10 is a flowchart for describing an operation according to a third embodiment.
Figure 11:
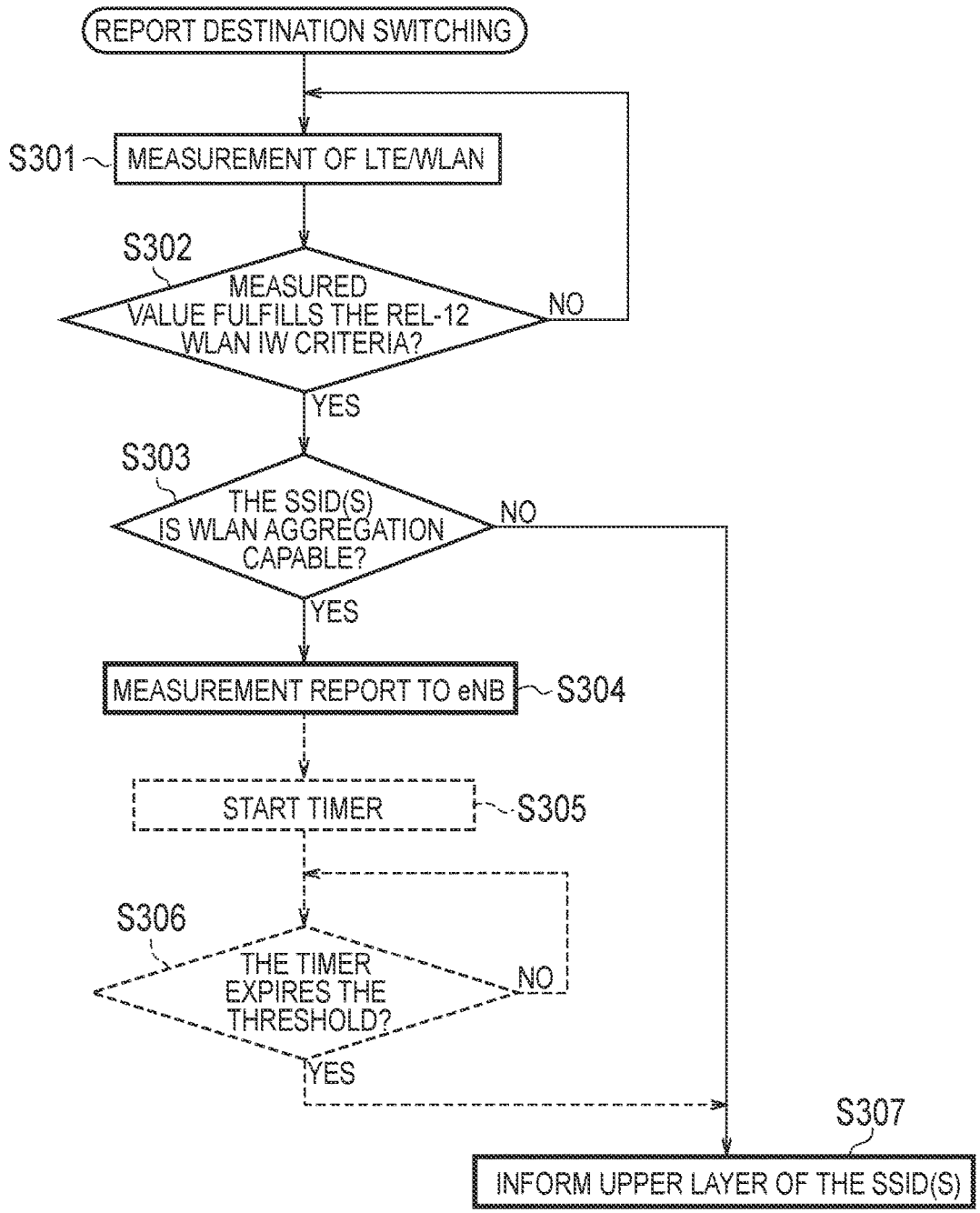
FIG. 11 is a sequence diagram for describing an operation of a UE 100 according to the third embodiment.

Next, a third embodiment will be described by using FIG. 10 and FIG. 11. FIG. 10 is a flowchart for describing an operation according to the third embodiment. FIG. 11 is a sequence diagram for describing an operation of the UE 100 according to the third embodiment.

In the third embodiment, a detailed description will be given to a restriction in a case where if UE-based switching control is performed, the UE 100 notifies the upper layer of the WLAN identifier. Description of similar portions to each of the above-described embodiments will be omitted where appropriate.

As illustrated in FIG. 10, in step S201, the eNB 200 transmits, to the UE 100, measurement configuration information (Configuration) for urging the radio signal from the AP 300 to be measured. The measurement configuration information may include the identifier of the AP 300 (WLAN identifier: SSID, for example) that is subject to (candidate for) the cellular/WLAN aggregation. Further, the measurement configuration information may include timer information (Threshold of timer) indicating a timer configured to restrict notification to the upper station (higher layer/upper layer).

The UE 100 starts, on the basis of the measurement configuration information, measurement of the radio signal from the AP 300. Further, the UE 100 starts measuring the radio signal from the eNB 200. The UE 100 performs measurement for acquiring a measurement value (cellular measurement result) for determining whether or not a first determination condition about a cellular is satisfied and a measurement value (WLAN measurement result) for determining whether or not a second determination condition about a WLAN is satisfied.

In step S202, the eNB 200 transmits a reference signal (Reference Signal) and the like. Further, the AP 300 transmits a beacon signal and the like.

The UE 100 measures the reference signal from the eNB 200 to acquire the cellular measurement result. Further, the UE 100 measures the beacon signal from the AP 300 to acquire the WLAN measurement result.

It is noted that the AP 300 transmits the radio signal (beacon signal) in each of a plurality of WLAN frequency bands, the UE 100 is capable of executing control to measure the beacon signal in each of the plurality of WLAN frequency bands. For example, if the measurement configuration information includes the WLAN frequency band measured by the UE 100 or information specifying a channel, the UE 100 measures the beacon signal in (a plurality of) the designated WLAN frequencies or (a plurality of) the designated channels. On the other hand, as for the UE 100, if the measurement configuration information does not include the WLAN frequency band or the information specifying a channel, the UE 100 measures the beacon signal in accordance with its own measurement capability. For example, if having a capability of measuring a 2.4 GHz band, the UE 100 measures the beacon signal in the 2.4 GHz band, if having a capability of measuring a 5 GHz band, the UE 100 measures the beacon signal in the 5 GHz band, and if having a capability of measuring the 2.4 GHz band and the 5 GHz band, the UE 100 measures the beacon signals in the both bands. Alternatively, if having a capability of measurement in one channel, the UE 100 measures the beacon signal in one channel, and if having a capability of measurement in a plurality of channels, the UE 100 measures the beacon signal in each of the plurality of channels.

It is noted that if having a capability of measuring a plurality of WLAN frequency bands, the UE 100 is capable of (individually) setting, to each of the plurality of WLAN frequency bands, a trigger (events A2, A3 and the like) to report the WLAN measurement result to the eNB 200. For example, the UE 100 is capable of setting the trigger to report the WLAN measurement result in the 2.4 GHz band to the event A2, and is capable of setting the trigger to report the WLAN measurement result in the 5 GHz band to the event A3.

In step S203, if the first determination condition and the second determination condition are both satisfied, the UE 100 notifies in a normal situation, on the basis of the cellular measurement result and the WLAN measurement result, the upper station configured to control bidirectional traffic switching between the E-UTRAN 10 and the WLAN 30, of the identifier (WLAN identifier) of the AP 300 that satisfies the second determination condition. However, the UE 100 notifies, under a predetermined condition, the eNB 200 of the WLAN measurement result before notifying the upper station of the WLAN identifier. That is, the UE 100 controls to switch the transmission targets.

For example, if measuring, on the basis of the measurement configuration information, the radio signal from the AP 300, the UE 100 notifies the eNB 200 of the WLAN measurement result before the notification to the upper station. The UE 100 may notify the eNB 200 of the cellular measurement result, together with the WLAN measurement result. On the other hand, if measuring, without relying on the measurement configuration information from the eNB 200, the radio signal from the AP 300, the UE 100 notifies the upper station as normally.

The UE 100 may not notify, after notifying the eNB 200 of the WLAN measurement result, the upper station of the WLAN identifier until a predetermined time period elapses. Here, the predetermined time period may be set (decided) by the timer information included in the measurement configuration information. The UE 100 is capable of notifying, if a timer set by the timer information expires, the upper station of the WLAN identifier.

Alternatively, the UE 100 need not notify the upper station of the WLAN identifier until receiving from the eNB 200 a message based on the notification since notifying the eNB 200 of the WLAN measurement result. The UE 100 is capable of notifying the upper station of the WLAN identifier if receiving a response from the eNB 200. The UE 100 does not notify the upper station of the WLAN identifier if the response from the eNB 200 is a reconfiguration message for requesting to the UE 100 a setting for executing the cellular/WLAN aggregation.

Alternatively, the UE 100 may cancel the notification of the WLAN identifier to the upper station if notifying the eNB 200 of the WLAN measurement result.

Next, an example of an operation of the UE 100 according to a third embodiment will be described by using FIG. 11. It is noted that description proceeds with an assumption that the UE 100 receives the measurement configuration information from the eNB 200.

As illustrated in FIG. 11, in step S301, the UE 100 measures the reference signal from the eNB 200 and measures the beacon signal from the AP 300.

In step S302, if the first determination condition and the second determination condition are both satisfied, the UE 100 executes, on the basis of the cellular measurement result and the WLAN measurement result, a process of step S303. On the other hand, if the first determination condition and the second determination condition are both not satisfied, the UE 100 executes a process of step S301.

In step S303, the UE 100 executes a process of step S304 if the (identifier of) the AP 300 that satisfies the second determination condition is the (identifier of) the AP 300 that is subject to (candidate for) the cellular/WLAN aggregation included in the measurement configuration information. It is noted that the eNB 200 may notify (configure) the UE 100, by the measurement configuration information, of the identifier of the AP 300 that is subject to the cellular/WLAN aggregation, and notify (configure) the UE 100 by another information.

On the other hand, the UE 100 executes a process of step S307 if the (identifier of) the AP 300 that satisfies the second determination condition is not the (identifier of) the AP 300 that is subject to the cellular/WLAN aggregation.

In step S304, the UE 100 transmits the WLAN measurement result to the eNB 200. The UE 100 may transmit, together with the WLAN measurement result, the cellular measurement result. As a result, the eNB 200, which is capable of knowing not only the WLAN measurement result but also the cellular measurement result, is capable of determining whether or not the cellular/WLAN aggregation is effective.

Further, if performing the carrier sense, the UE 100 may transmit, together with the WLAN measurement result, the carrier sense result, to the eNB 200. As a result, the eNB 200, which is capable of determining whether or not the UE 100 is capable of normally performing reception and/or transmission by the WLAN communication, is capable of further determining whether the cellular/WLAN aggregation is effective.

The UE 100 may be explicitly requested by the measurement configuration information, for example, from the eNB 200, the report of the carrier sense result and may autonomously report the carrier sense result without the request from the eNB 200. For example, if the carrier sense result is poor (if an interference power amount indicated by the carrier sense result is equal to or more than a threshold value), the UE 100 may report the carrier sense result.

Further, if the connection with the AP 300 that is subject to the cellular/WLAN aggregation is completed, the UE 100 may transmit the WLAN measurement result to the eNB 200. As a result, if receiving the WLAN measurement result, the UE 100 is capable of executing control for smoothly starting the cellular/WLAN aggregation because the eNB 200 already completes the connection with the AP 300 that is subject to the cellular/WLAN aggregation.

If executing the process of step S304, the UE 100 may omit the processes of steps S305 to S307. That is, the processes of S305 and S306 are optional. Therefore, the UE 100 may cancel the notification of the WLAN identifier to the upper station if notifying the eNB 200 of the WLAN measurement result.

In step S305, the UE 100 activates a timer.

In step S306, the UE 100 determines whether or not the timer reaches a threshold value. The threshold value may be indicated by the timer information included in the measurement configuration information. If the timer reaches the threshold value (that is, if the timer expires), the UE 100 executes a process of step S307.

In step S307, the UE 100 notifies the upper station of the WLAN identifier (SSID). It is noted that if starting the control of the cellular/WLAN aggregation (if performing the setting about the cellular/WLAN aggregation), the UE 100 omits the process of step S307.

Thus, the UE 100 notifies, before notifying the upper station of the WLAN identifier, the eNB 200 of the WLAN measurement result. As a result, before the switching control by the upper station is performed, the eNB 200 is capable of controlling, on the basis of the WLAN measurement result, the UE 100. Therefore, the eNB 200 is capable of effectively controlling the cellular/WLAN aggregation.

Fourth Embodiment

Figure 12:
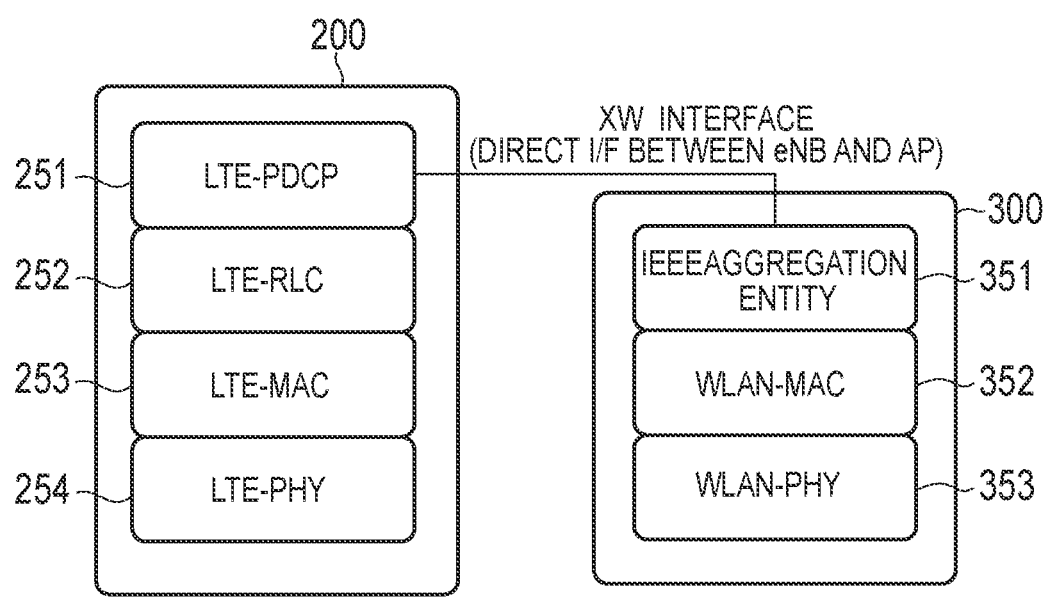
FIG. 12 is a diagram for describing an AG entity according to a fourth embodiment.

Next, a fourth embodiment will be described by using FIG. 12 and FIG. 13. Description of similar portions to each of the above-described embodiments will be omitted. In the fourth embodiment, the AP 300 has an aggregation entity (hereinafter, "AG entity") (see FIG. 12). A controller of the AP 300 executes a function of the AG entity. FIG. 12 is a diagram for describing the AG entity according to the fourth embodiment. FIG. 13 is a sequence diagram for describing an operation of an AG entity according to the fourth embodiment.

(AG Entity)

As illustrated in FIG. 12, the eNB 200 includes a PDCP entity (LTE-PDCP) 251, an RLC entity (LTE-RLC) 252, an MAC entity (LTE-MAC) 253, and a PHY entity (LTE-PHY) 254. On the other hand, the AP 300 includes an AG entity (ieeeAggregation entity) 351, an MAC entity (WLAN-MAC) 352, and a PHY entity (WLAN-PHY) 353.

The AG entity 351 is located above the MAC entity 352. Further, between the AG entity 351 and the eNB 200 (PDCP entity 251), a direct communication pathway is set.

The AG entity 351 controls the cellular/WLAN aggregation in which the data of the UE 100 connected to the AP 300 is transmitted and received by using both the cellular communication and the WLAN communication. If the cellular/WLAN aggregation is executed, in the cellular/WLAN aggregation, a data bearer that passes through the eNB 200 and the AP 300, that is, the data bearer divided in the eNB 200 (hereinafter, "AG data bearer"), is established (see the above-described data bearer #2-2). In FIG. 12, the AG data bearer is divided in the PDCP entity 251 of the eNB 200.

In a downlink, the AG entity 351 receives from the eNB 200 (PDCP entity 251) the data packet (user data) of the UE 100 belonging to the AG data bearer by using the direct communication pathway. The AG entity 351 performs a predetermined process on the received data packet and sends the data packet to the MAC entity 352. For example, the AG entity 351 converts the packet of a cellular communication protocol format into a packet of a WLAN communication protocol format. In an uplink, the AG entity 351 performs the opposite process.

It is noted that the AG entity 351 corresponds to any protocol of IEEE 802 Series. For example, the AG entity 351 corresponds to "IEEE802.11ad", "IEEE802.11ac", "IEEE802.11n", "IEEE802.11g", and the like.

It is noted that the PDCP entity 251 has a PDCP function 241#2. The RLC entity 252 includes an RLC function 242#2. The MAC entity 253 includes an MAC function 243#2. The PHY entity 254 includes a PHY function. Further, the MAC entity 352 includes an MAC LME function 342. The PHY entity 353 includes a PHY LME function 343.

It is noted that in FIG. 12, an LLC entity provided in the AP 300 is omitted. The LLC entity described above including an LLC function 341 may be located between the AG entity 351 and the MAC entity 352, and may be located above the AG entity 351. Alternatively, the LLC entity may be located at the same hierarchy as the AG entity 351. Inside the AP 300, data belonging to the data bearer #2 is processed in the LLC function 341, below.

(Operation of AG Entity)

Next, in an operation of the AG entity 351, a first operation of the AG entity 351 is an operation before the cellular/WLAN aggregation is started.

As illustrated in FIG. 13, in step S10, the eNB 200 uses a direct communication pathway to transmit an execution request of the WLAN communication (WLAN addition request) in the cellular/WLAN aggregation to the AG entity 351 (AP 300).

The eNB 200 may include a predetermined identifier (check information) assigned to the UE 100 subject to the cellular/WLAN aggregation, into the execution request. The predetermined identifier may be an identifier retained for the UE 100 subject to the cellular/WLAN aggregation, for example, and may be a C-RNTI assigned to the UE 100 subject to the cellular/WLAN aggregation. If the predetermined identifier is included in the execution request, the AG entity 351 (memory 330) stores the predetermined identifier as the check information for checking as to whether or not the UE 100 that transmits the connection request is subject to the cellular/WLAN aggregation.

Further, the execution request may include an identifier (bearer identifier: bearer ID) corresponding to the data bearer used for the cellular/WLAN aggregation. The check information may be a list in which a plurality of bearer identifiers used for the cellular/WLAN aggregation are listed.

Further, the execution information may include an identifier of a tunneling layer (TEID). The TEID is used if generating a logical communication path through which user plane data (PDCP PDU) is transferred, and is an identifier indicating the communication path.

Further, the execution request may include a latest measurement report about the radio signal of the AP 300 received by the eNB 200 from the UE 100 and/or a latest carrier sense result.

Further, the execution request may include a throughput maximum value (restriction value) of the UE 100.

In step S20, the AG entity 351 transmits to the eNB 200 a response to the execution request (WLAN addition response). The response to the execution request may include (a list of) rejected (unadmitted) bearer identifiers, out of a plurality of bearer identifiers included in the execution request. Further, for example, if the execution request does not include the above-described information (the bearer identifier, the TEID, the measurement report, the carrier sense result, the throughput maximum value of the UE 100, and the like), the response to the execution request may include the above-described information (the bearer identifier, the TEID, the carrier sense result measured by the AP 300, the throughput maximum value of the UE 100, and the like).

If it is possible to execute the WLAN communication in the cellular/WLAN aggregation, the AG entity 351 transmits an acknowledgment to the eNB 200. On the other hand, if it is not possible to execute the WLAN communication in the cellular/WLAN aggregation, the AG entity 351 transmits a negative acknowledgment to the eNB 200. The negative acknowledgment may include a reason (Cause) for determining that it is not possible to execute the WLAN communication in the cellular/WLAN aggregation. The AG entity 351 determines in accordance with a load of the AP 300, for example, whether or not it is possible to execute the WLAN communication.

If a predetermined identifier is not included in the execution request, the AG entity 351 assigns the predetermined identifier to the UE 100 subject to the cellular/WLAN aggregation to include the predetermined identifier into the acknowledgment. The AG entity 351 (memory 230) stores, as the check information, the predetermined identifier included into the acknowledgment.

Further, if managing a plurality of WLAN frequency bands (2.4 GHz and 5 GHz, for example) available for the WLAN communication, the AG entity 351 may include information indicating, out of the plurality of WLAN frequencies, the WLAN frequency band that should be used by the UE 100, into the acknowledgment. The AG entity 351 is capable of deciding the WLAN frequency band that should be used by the UE 100, on the basis of the carrier sense result that is a result obtained after the AP 300 performs the carrier sense indicating an interference status in a plurality of WLAN frequency bands available for the WLAN communication. In this case, the WLAN frequency band that should be used by the UE 100 is a frequency band in which an interference power amount is less than a threshold value.

Further, the AG entity 351 may create predetermined information on a setting of the cellular/WLAN aggregation in the UE 100 (part of RRC Connection Reconfiguration). The predetermined information is, for example, a predetermined identifier assigned by the AG entity 351, a WLAN frequency band that should be used by the UE 100, an identifier of the AP 300 to which the UE 100 should connect (SSID, for example), and the like. The AG entity 351 transmits to the eNB 200 the predetermined information included into the acknowledgment.

Further, only if the carrier sense result is good (that is, an interference level (interference power amount) in the WLAN frequency band utilized in the WLAN communication is less than a threshold value), the AG entity 351 may transmit the acknowledgment to the execution request. The AG entity 351 may perform, triggered by the reception of the execution request, the carrier sense. Alternatively, if receiving the execution request before a predetermined time period elapses since acquiring a latest carrier sense result, the AG entity 351 may determine on the basis of the latest carrier sense result whether or not to transmit the acknowledgment. As a result, it is possible to effectively execute the cellular/WLAN aggregation.

The eNB 200 uses a direct communication pathway to thereby receive the acknowledgment to acquire predetermined information for setting the cellular/WLAN aggregation (a predetermined identifier assigned by the AG entity 351, a WLAN frequency band that should be used by the UE 100, an identifier of the AP 300 to which the UE 100 should connect, and the like) from the AG entity 351. This eliminates a need for the eNB 200 to manage the information of the AP 300 for the cellular/WLAN aggregation, and thus, it is possible to reduce a load of the eNB 200. If the eNB 200 is connected to a large number of APs 300, it is not necessary to collectively manage the information of the large number of APs 300, and thus, this is particularly effective.

The eNB 200 executes the following process if the response to the execution request is an acknowledgment.

In step S30, the eNB 200 transmits, to the UE 100, a configuration message (RRC Connect Reconfiguration) about the configuration of the cellular/WLAN aggregation.

The eNB 200 includes predetermined information included in the acknowledgment from the AG entity 351, into the configuration message. Alternatively, if receiving the predetermined information (part of RRCConnection Reconfiguration) from the AG entity 351, the eNB 200 may integrate the information with a configuration message (RRCConnection Reconfiguration) created in the eNB 200, and then, transmit the integrated configuration message to the UE 100. As a result, the AG entity 351 creates a part of the RRCConnection Reconfiguration, and thus, a process load of the eNB 200 is reduced.

The UE 100 performs, on the basis of the configuration message, the setting of the cellular/WLAN aggregation.

In step S40, the UE 100 transmits, to the AP 300, a connection request (Association request) to the AP 300. If the connection request to the AP 300 is triggered by the setting of the cellular/WLAN aggregation, the UE 100 transmits the connection request. If information indicating the WLAN frequency band is included in the configuration message, the UE 100 searches the AP 300 in the WLAN frequency band and transmits the connection request to the discovered AP 300. If an identifier indicating the AP 300 is included in the configuration message, the UE 100 transmits the connection request to the AP 300 indicated by the identifier.

If a predetermined identifier is included in the configuration message, the UE 100 transmits, as the check information, the connection request including the predetermined identifier, to the AP 300. If the predetermined identifier is not included in the configuration message, the UE 100 may include, as the check information, a C-RNTI assigned from the eNB 200, into the connection request.

In step S50, the AG entity 351 determines whether or not the stored check information matches the check information received from the UE 100. The stored check information is check information received from the eNB 200 or the check information transmitted by the AG entity 351 to the eNB 200. If the stored check information matches the check information received from the UE 100, the AG entity 351 determines that the UE 100 from which the connection request is transmitted is subject to the cellular/WLAN aggregation. On the other hand, if the stored check information does not match the check information received from the UE 100, or if the check information is not included into the connection request, the AG entity 351 determines that the UE 100 from which the connection request is transmitted is not subject to the cellular/WLAN aggregation.

If determining that the UE 100 from which the connection request is transmitted is subject to the cellular/WLAN aggregation, that is, if the connection request includes the predetermined information with an indication of being subject to the cellular/WLAN aggregation, the AG entity 351 starts controlling the cellular/WLAN aggregation. Further, even if rejecting the normal connection request received from the UE 100, the AG entity 351 may admit the connection request of the UE 100 subject to the cellular/WLAN aggregation. This is because a communication data amount between the AP 300 and the UE 100 in which the cellular/WLAN aggregation is executed is assumed to be smaller than a communication data amount between the AP 300 and the normal UE 100 in which the cellular/WLAN aggregation is not executed.

Thus, if determining that the UE 100 from which the connection request is transmitted is subject to the cellular/WLAN aggregation, the AG entity 351 is capable of starting controlling the cellular/WLAN aggregation, and thus, it is possible to execute the effective cellular/WLAN aggregation.

First Modification of Fourth Embodiment

Next, a first modification of the fourth embodiment will be described. Description of similar portions to each of the above-described embodiments will be omitted. In the first modification of the fourth embodiment, the predetermined information is information indicating that the connection request is a request for the cellular/WLAN aggregation.

For example, the UE 100 configured to transmit a normal connection request includes flag information (flag indicating "0 (OFF)") with an indication of not being a request for the cellular/WLAN aggregation, into the connection request. The flag information may be indicated in 1 bit. Alternatively, the UE 100 transmits the normal connection request.

On the other hand, the UE 100 configured to transmit to the AP 300 the connection request for the cellular/WLAN aggregation includes flag information (flag indicating "1 (ON)") with an indication of being a request for the cellular/WLAN aggregation, into the connection request. Alternatively, the UE 100 includes information with an indication of being a request for the cellular/WLAN aggregation, into a header of Information element, for example.

As a result, the AP 300 is capable of easily determining, on the basis of the information with an indication of being a request for the cellular/WLAN aggregation, whether or not the UE 100 from which the connection request is transmitted is subject to the cellular/WLAN aggregation.

Second Modification of Fourth Embodiment

Next, a first modification of the fourth embodiment will be described. Description of similar portions to each of the above-described embodiments will be omitted. In the second modification of the fourth embodiment, the predetermined information is identification information indicating the eNB 200 or the cell for which the UE 100 performs the cellular communication in the cellular/WLAN aggregation.

The UE 100 configured to transmit, for the cellular/WLAN aggregation, the connection request to the AP 300, includes identification information that is an identifier (Cell ID) indicating a cell in which the UE 100 exists and/or an identifier of the eNB 200 configured to manage the cell, into the connection request.

If the connection request includes the identification information, the AP 300 is capable of determining that the UE 100 from which the connection request is transmitted is subject to the cellular/WLAN aggregation. Further, the AP 300 is capable of including the identifier indicating the cell, into a response (header, for example) to the execution request. As a result, the eNB 200 is capable of easily identifying, on the basis of the identification information, to the UE 100 the cell subject to the cellular/WLAN aggregation. This is particularly effective if the cellular/WLAN aggregation is executed together with the eNB 200 configured to manage a plurality of cells.

Further, if a direct communication pathway is set (established) with each of a plurality of eNBs 200, the AP 300 is easily identifying, on the basis of the identifier of the eNB 200 included in the connection request, the eNB 200 subject to the cellular/WLAN aggregation. Therefore, it is possible to effectively control the cellular/WLAN aggregation.

Fifth Embodiment

Next, a fifth embodiment will be described by using the above-described FIG. 7. Description of similar portions to each of the above-described embodiments will be omitted. The fifth embodiment relates to a change (release) of the data bearer.

In FIG. 7, a case is assumed where only the data bearer #1 that is a data bearer for normal cellular communication is established. Thus, in a state where the data bearer #1 is established and if the cellular/WLAN aggregation is started, the eNB 200 transmits to the UE 100 subject to the cellular/WLAN aggregation establishment information (wlanToAddmodListwlan) for establishing the data bearer #2 that is a data bearer for a cellular/WLAN aggregation. The establishment information includes (a list (wlanToAddModList) of) bearer IDs indicating a data bearer subject to establishment. The UE 100 receives the release information. The UE 100 receives the establishment information.

Here, if changing the data bearer #1 to the data bearer #2, the eNB 200 includes a bearer identifier (bearer ID#A) indicating the already established data bearer #1, into the establishment information.

The bearer ID#A included in the establishment information matches the bearer ID#A indicating the already established data bearer #1, and thus, the UE 100 releases the data bearer #1 and starts control to newly establish the data bearer #2 corresponding to the bearer ID#A. On the other hand, if the bearer ID included in the establishment information is a new bearer ID, the UE 100 starts control to newly establish the data bearer #2 corresponding to a new bearer ID.

It is noted that the establishment information may include bearer type information associated with the bearer ID. The bearer type information here indicates a type of the data bearer #2. As a result, the UE 100 is capable of obviously recognizing that the data bearer #1 is changed to the data bearer #2.

The eNB 200, which is capable of omitting the transmission of information for releasing the data bearer #1 to the UE 100, is capable of reducing signaling.

Next, in FIG. 7, a case is assumed where only the data bearer #2 is established. Thus, in a state where the data bearer #2 is established and if the cellular/WLAN aggregation is ended, the eNB 200 transmits, to the UE 100 that is executing the cellular/WLAN aggregation, release information (wlanToBeReleasedListwlan) for releasing the data bearer #2. The release information includes (a list (wlanToBeReleasedList) of) bearer IDs indicating a data bearer subject to release. The UE 100 receives the release information.

Here, if changing the data bearer #2 to the data bearer #1, the eNB 200 includes a bearer identifier (bearer ID#A) indicating the already established data bearer #2, into the release information.

The bearer ID#A included in the release information matches the bearer ID#A indicating the already established data bearer #2, and thus, the UE 100 releases the data bearer #2 and starts control to newly establish the data bearer #1 corresponding to the bearer ID#A.

It is noted that the release information may include bearer type information associated with the bearer ID. The bearer type information here indicates a type of the data bearer #1. As a result, the UE 100 is capable of obviously recognizing that the data bearer #2 is changed to the data bearer #1.

The eNB 200, which is capable of omitting the transmission of information for establishing the data bearer #1, is capable of reducing signaling.

On the other hand, if the data bearer #2 is released without changing the data bearer #2 to the data bearer #1, the eNB 200 transmits to the UE 100, together with the release information (first release information), second release information for releasing the data bearer #1. The eNB 200 includes (a list (ToBeReleasedList) of) bearer identifiers (bearer ID#A) indicating the already established data bearer #2, into the second release information.

The bearer ID#A included in the first release information matches the bearer ID#A included in the second release information, and thus, the UE 100 starts control to release the data bearer #2 and omits control to newly establish the data bearer #1 corresponding to the bearer ID#A.

Next, in FIG. 7, a case is assumed where only the data bearer #2 is established. Thus, in a state where the data bearer #2 is established and if the data bearer #2 is changed to another data bearer #2, the eNB 200 transmits, to the UE 100 that is executing the cellular/WLAN aggregation, establishment information (wlanToBeReleasedList) for establishing the data bearer #2. The establishment information includes, in addition to (a list of) bearer IDs indicating a data bearer subject to establishment, at least one of an identifier indicating the AP 300 (WLAN identifier) and information indicating the WLAN frequency band (for example, 5 GHZ/2.4 GHz/60 GHz, and the like).

Here, if changing the data bearer #2 to the other data bearer #2, the eNB 200 includes a bearer identifier (bearer ID#A) indicating the already established data bearer #2, into the establishment information. Further, the eNB 200 includes a WLAN identifier indicating the AP 300 different from the AP 300 that is executing the cellular/WLAN aggregation, into the establishment information. Further, the eNB 200 includes information indicating the WLAN frequency band indicating a frequency band different from the WLAN frequency band used in the cellular/WLAN aggregation, into the establishment information.

If the bearer ID#A included in the establishment information matches the bearer ID#A indicating the already established data bearer #2, the UE 100 starts control to release the data bearer #2 corresponding to the bearer ID#A and starts control to establish a new data bearer #2 with the AP 300 corresponding to the WLAN identifier included in the establishment information or control to establish a new data bearer #2 in which the WLAN frequency band included in the establishment information is utilized.

The eNB 200, which is capable of omitting the transmission of information for releasing the already established data bearer #2 to the UE 100, is capable of reducing signaling.

It is noted that the eNB 200 is capable of deciding, on the basis of the WLAN measurement result from the UE 100, the change (release) of the data bearer. If deciding the change (release) of the data bearer, the eNB 200 is capable of transmitting an RRCConnectionReconfiguration message including the establishment information/release information.

Other Embodiments

In each of the aforementioned embodiments, the operation of the AP 300 about the cellular/WLAN aggregation may be executed by the AG entity 351 in the fourth embodiment. Alternatively, the MAC entity 352 provided in the AP 300 may execute a function of the AG entity 351. Alternatively, a node (for example, AC: Access Controler) configured to control (a plurality of) the AP 300 may have the AG entity. The eNB 200 is capable of exchanging predetermined information with the AG entity within the AC by using a direct communication pathway. Alternatively, if the eNB 200 is a type of eNB 200 in which cellular and WLAN are integrated, the eNB 200 may include an AG entity. The eNB 200 may make the AG entity control the cellular/WLAN aggregation.

Further, in each of the above-described embodiments, the UE 100 configured to transmit the connection request destined to the AP 300 may execute the above-described operation if starting the cellular/WLAN aggregation, and may execute the above-described operation if changing the AP 300 subject to the cellular/WLAN aggregation during execution of the cellular/WLAN aggregation, and if changing the WLAN frequency band utilized for the cellular/WLAN aggregation.

The operations according to each of the above-described embodiments are not limited to a case in which these operations are performed separately, and operations according to two or more embodiments may be combined and performed.

In each of the above-described embodiments, as one example of a cellular communication system, the LTE system is described; however, the present discloser is not limited to the LTE system, and the present disclosure may be applied to systems other than the LTE system.

The invention claimed is:

1. A communication system in which supports cellular communication in a Long Term Evolution (LTE) system and Wireless Local Area Network (WLAN) communication, comprising:
   a base station; and
   a user terminal, wherein
   the base station transmits first information to the user terminal in a state where a predetermined data bearer is established, wherein the predetermined data bearer is a first data bearer between the base station and the user terminal, and the first information is for establishing a second data bearer between the base station and the user terminal,
   the user terminal receives the first information from the base station in the state where the predetermined data bearer is established,
   the first data bearer passes through the base station without passing through an access point,
   the second data bearer: passes through the base station and the access point; and is for aggregation in which the cellular communication and the WLAN communication are used to communicate data of the user terminal,
   the first information includes a bearer identifier indicating the already established predetermined data bearer and type information associated with the bearer identifier, and
   the user terminal starts control to change the predetermined data bearer from the first data bearer to the second data bearer if the type information indicates a change from the first data bearer to the second data bearer.

2. The communication system according to claim 1, wherein
   the base station transmits second information to the user terminal in a state where the predetermined data bearer being the second data bearer between the base station and the user terminal is established, wherein the second information is for releasing the second data bearer,
   the user terminal receives the second information from the base station in the state where the predetermined data bearer is established,
   the second information includes a bearer identifier indicating the already established predetermined data bearer and type information associated with the bearer identifier, and
   the user terminal starts control to change the predetermined data bearer from the second data bearer to the first data bearer if the type information indicates a change from the second data bearer to the first data bearer.

3. The communication system according to claim 1, wherein
   the base station sends a request of the WLAN communication to an entity controlling the aggregation, via a Xw interface between the base station and the entity, before establishing the second data bearer,
   the base station receives a response to the request of the WLAN communication,
   the base station transmits the first information to the user terminal in response to the response being an acknowledgment.

4. The communication system according to claim 3, wherein
   the request includes a bearer identifier indicating the predetermined data bearer.

5. The communication system according to claim 3, wherein
   the request includes identifier indicating communication pass for transferring date of the user terminal between the base station and the entity.

6. The communication system according to claim 3, wherein
   the response includes identifier identifying the user terminal and allocated by the entity.

7. The communication system according to claim 3, wherein
   the response includes a list of an bearer identifier which the entity is not admit.

8. The communication system according to claim 3, wherein
   the response includes a cause for rejecting the request if the response is a negative acknowledgment.

9. The communication system according to claim 3, wherein
   the request includes information to be used to check the user terminal by the entity, and the user terminal transmits the information in response to receiving the first information received from the base station.

10. A user terminal supporting cellular communication in a Long Term Evolution (LTE) system and Wireless Local Area Network (WLAN) communication, comprising:
a receiver; and
a controller, wherein
the receiver is configured to receive first information from a base station in a state where a predetermined data bearer is established, wherein the predetermined data bearer is a first data bearer between the base station and the user terminal, and the first information is for establishing a second data bearer between the base station and the user terminal,
the first data bearer passes through the base station without passing through an access point,
the second data bearer: passes through the base station and the access point; and is for aggregation in which the cellular communication and the WLAN communication are used to communicate data of the user terminal,
the first information includes a bearer identifier indicating the already established predetermined data bearer and type information associated with the bearer identifier, and
the controller is configured to control to change the predetermined data bearer from the first data bearer to the second data bearer if the type information indicates a change from the first data bearer to the second data bearer.

11. A base station, comprising:
a transmitter; and
a controller, wherein
the transmitter is configured to transmit first information to a user terminal in a state where a predetermined data bearer is established, wherein the predetermined data bearer is a first data bearer between the base station and the user terminal, and the first information is for establishing a second data bearer between the base station and the user terminal,
the first data bearer passes through the base station without passing through an access point,
the second data bearer: passes through the base station and the access point; and is for aggregation in which cellular communication in a Long Term Evolution (LTE) system and Wireless Local Area Network (WLAN) communication are used to communicate data of the user terminal, and
the controller is configured to include a bearer identifier and type information in the first information, wherein the bearer identifier indicates the already established predetermined data bearer and the type information is associated with the bearer identifier.

* * * * *